US012073804B2

(12) United States Patent
Tsuchi et al.

(10) Patent No.: US 12,073,804 B2
(45) Date of Patent: Aug. 27, 2024

(54) SIGNAL LEVEL SHIFT CONVERSION CIRCUIT FOR DISPLAY DRIVER AND DISPLAY DEVICE CONVERTING INPUT VOLTAGE SIGNAL AT SYNCHRONIZED TIMING

(71) Applicant: LAPIS Technology Co., Ltd., Yokohama (JP)

(72) Inventors: Hiroshi Tsuchi, Yokohama (JP); Hayato Koizumi, Yokohama (JP)

(73) Assignee: LAPIS Technology Co., Ltd., Yokohama (JP)

(*) Notice: Subject to any disclaimer, the term of this patent is extended or adjusted under 35 U.S.C. 154(b) by 0 days.

(21) Appl. No.: 17/555,485

(22) Filed: Dec. 19, 2021

(65) Prior Publication Data

US 2022/0208136 A1 Jun. 30, 2022

(30) Foreign Application Priority Data

Dec. 25, 2020 (JP) ................................ 2020-216101

(51) Int. Cl.
*G09G 3/36* (2006.01)

(52) U.S. Cl.
CPC ......... *G09G 3/3614* (2013.01); *G09G 3/3696* (2013.01); *G09G 2310/0289* (2013.01); *G09G 2310/08* (2013.01)

(58) Field of Classification Search
CPC ...... G09G 3/36; G09G 3/3611; G09G 3/3614; G09G 3/3696; G09G 2310/0278; G09G 2310/0289; G09G 2310/0291; G09G 3/3692; G09G 3/3622; G09G 3/3625; G09G 3/364; G09G 3/3644; G09G 3/3648; G09G 3/3666; G09G 3/3677; G09G 3/3681; G09G 3/3685; G09G 3/3688

(Continued)

(56) References Cited

U.S. PATENT DOCUMENTS 9,893,729 B2 * 2/2018 Kuo ............... H03K 19/018521
9,940,867 B2 * 4/2018 Tsuchi .................. G11C 19/00
(Continued)

FOREIGN PATENT DOCUMENTS

JP 2008102211 5/2008

*Primary Examiner* — Ke Xiao
*Assistant Examiner* — Nelson Lam
(74) *Attorney, Agent, or Firm* — JCIPRNET

(57) ABSTRACT

The disclosure includes: first level shift part generating a voltage signal by converting an input voltage signal into amplitude between first negative and positive polarity power supply voltages; second level shift part generating a first polarity voltage signal by converting the voltage signal into amplitude between a reference and the first positive polarity power supply voltage; third level shift part outputting a first-polarity high voltage signal by converting the first polarity voltage signal into amplitude between a higher second positive polarity power supply voltage and the reference; fourth level shift part generating a second polarity voltage signal by converting the voltage signal into amplitude between the reference and the first negative polarity power supply voltage; and fifth level shift part outputting a second-polarity high voltage signal by converting the second polarity voltage signal into amplitude between a lower second negative polarity power supply voltage and the reference.

16 Claims, 9 Drawing Sheets

(58) Field of Classification Search
USPC .................................................... 345/87–104
See application file for complete search history.

(56) References Cited

U.S. PATENT DOCUMENTS

| | | | | |
|---|---|---|---|---|
| 10,255,847 | B2 * | 4/2019 | Tsuchi | H03K 19/017 |
| 2002/0154086 | A1 * | 10/2002 | Furuhashi | G09G 3/2011 345/100 |
| 2008/0158204 | A1 * | 7/2008 | Chang | G09G 3/3677 345/204 |
| 2009/0289888 | A1 * | 11/2009 | Aoki | G09G 3/3688 345/100 |
| 2011/0193848 | A1 * | 8/2011 | Kojima | H03K 19/018571 327/108 |
| 2012/0139893 | A1 * | 6/2012 | Chung | G09G 3/3688 345/212 |
| 2012/0313685 | A1 * | 12/2012 | Kim | H03K 3/356113 327/333 |
| 2014/0184581 | A1 * | 7/2014 | Peng | G09G 3/3688 345/212 |
| 2014/0253531 | A1 * | 9/2014 | Lee | G09G 3/3677 345/212 |
| 2016/0126956 | A1 * | 5/2016 | Ryu | G09G 3/3688 327/333 |
| 2017/0154568 | A1 * | 6/2017 | Tsuchi | G09G 3/2092 |
| 2018/0366077 | A1 * | 12/2018 | Higuchi | H03F 3/45269 |
| 2020/0312264 | A1 * | 10/2020 | Tsuchi | G09G 3/3688 |
| 2022/0270563 | A1 * | 8/2022 | Tsuchi | G09G 3/3685 |

* cited by examiner

SIGNAL LEVEL SHIFT CONVERSION CIRCUIT FOR DISPLAY DRIVER AND DISPLAY DEVICE CONVERTING INPUT VOLTAGE SIGNAL AT SYNCHRONIZED TIMING

CROSS-REFERENCE TO RELATED APPLICATION

This application claims priority under 35 USC 119 from Japanese Patent application No. 2020-216101 filed on Dec. 25, 2020, the disclosure of which is incorporated by reference herein.

BACKGROUND

Technical Field

The disclosure relates to a signal level conversion circuit that converts an input signal into a high voltage signal of a positive polarity and a high voltage signal of a negative polarity, a drive circuit including the signal level conversion circuit, a display driver including the drive circuit, and a display device including the drive circuit.

Description of Related Art

Currently, in display devices for various purposes such as TVs, monitors, PCs, and car navigation systems, a liquid crystal display device using an active matrix drive type liquid crystal panel is employed as a display device. These liquid crystal display devices are becoming larger and higher in quality year by year, and a demand for high resolution and a high drive frequency is increasing.

A plurality of data lines extending in a vertical direction of a two-dimensional screen and a plurality of gate lines extending in a horizontal direction of the two-dimensional screen are disposed alternately in the liquid crystal panel. Further, a pixel part connected to the data line and the gate line is formed at each intersection of the plurality of data lines and the plurality of gate lines.

The liquid crystal display device includes such a liquid crystal panel and a data driver that supplies a gradation data signal having an analog voltage value corresponding to a brightness level of each pixel to the data lines with a data pulse in one horizontal scanning period unit.

To prevent deterioration of the liquid crystal panel, the data driver performs polarity inversion drive for alternately supplying a gradation data signal of a first polarity (a positive polarity) and a gradation data signal of a second polarity (a negative polarity) to the liquid crystal panel at predetermined frame periods.

As the data driver that performs such polarity inversion drive, a data driver including a drive circuit that switches a drive voltage of a positive polarity and a drive voltage of a negative polarity with 0 volts as a reference and outputs them has been proposed (see FIGS. 8 to 10 of Patent Document 1 "Japanese Patent Laid-Open No. 2008-102211", for example). In the drive circuit described in Patent Document 1, a state in which a positive polarity voltage signal (5 V) is output from an output pad OUT1 (a state of FIG. 8 of the same document) is switched to a state in which a negative polarity voltage signal (−5 V) is output from the output pad OUT1 (a state of FIG. 10 of the same document) using switches SW1 to SW12 shown in FIG. 8 of the same document.

Further, in performing such polarity switching, in the drive circuit, one end of each switch is first set to a state of 0 V as shown in FIG. 9 of the same document, and then the state is switched to a state shown in FIG. 10 of the same document. This makes it possible to configure a normally used withstand voltage element of each switch (transistor) with a low withstand voltage element in about ½ of a liquid crystal drive voltage range.

Incidentally, the switch SW1 described in Patent Document 1 is a switch (for example, a CMOS transistor switch) through which a positive polarity voltage signal (0 V to 5 V) is passed, and the switch SW1 operates within a positive polarity voltage range. The switch SW9 is a switch (for example, an NMOS transistor switch) that resets a node through which a positive polarity voltage signal is passed to 0 V, and the switch SW9 operates within a positive polarity voltage range. When the switch SW5 is in an on state, a positive polarity voltage signal (0 V to 5 V) is output to an output terminal OUT1, and when the switch SW5 is in an off state, a negative polarity voltage signal (0 V to −5 V) which is output to the output terminal OUT1 is shut off to avoid entering a positive polarity voltage signal output circuit side. Therefore, the switch SW5 is constituted by a PMOS transistor switch. At this time, to pass a positive polarity voltage signal (0 V to 5 V) through the PMOS transistor switch SW5, a gate of the PMOS transistor switch SW5 has to be controlled within a negative polarity voltage range (0 V to −5 V) in an element withstand voltage. Further, the switch SW2 is a switch (for example, a CMOS transistor switch) through which a negative polarity voltage signal (0 V to −5 V) is passed, and the switch SW2 operates within a negative polarity voltage range. The switch SW10 is a switch (for example, a PMOS transistor switch) that resets a node through which a negative polarity voltage signal is passed to 0 V, and the switch SW10 operates within a negative polarity voltage range. When the switch SW6 is in an on state, a negative polarity voltage signal (0 V to −5 V) is output to an output terminal OUT1, and when the switch SW6 is in an off state, a positive polarity voltage signal (0 V to 5 V) which is output to the output terminal OUT1 is shut off to avoid entering a negative polarity voltage signal output circuit side. Therefore, the switch SW6 is constituted by an NMOS transistor switch. Then, to pass a negative polarity voltage signal (0 V to −5 V) through the NMOS transistor switch SW6, a gate of the NMOS transistor switch SW6 has to be controlled within a positive polarity voltage range (0 V to 5 V) in an element withstand voltage.

As described above, in the drive circuit described in Patent Document 1, in a case in which a positive polarity voltage signal is output to the output terminal OUT1, the switches SW1 and SW9 need to be controlled with a control signal in a positive polarity voltage range, and the switch SW5 needs to be controlled with a control signal in a negative polarity voltage range. Further, in a case in which a negative polarity voltage signal is output to the output terminal OUT1, the switches SW2 and SW10 need to be controlled with a control signal in a negative polarity voltage range, and the switch SW6 needs to be controlled with a control signal in a positive polarity voltage range.

Further, in the drive circuit, it is necessary to synchronize a timing of a control signal on a positive polarity side and a timing of a control signal on a negative polarity side in order to perform the polarity switching correctly.

However, a circuit (a positive polarity side control circuit) is configured in the withstand voltage range (0 V to 5 V) on a positive polarity side of the control signal on a positive polarity side, and a circuit (a negative polarity side control circuit) is configured in the withstand voltage range (0 V to −5 V) on a negative polarity side of the control signal on a negative polarity side. From the viewpoint of cost reduction, an element having a withstand voltage in a voltage range of both positive and negative polarities cannot be used. Further, due to the circuit configuration, a circuit delay of the positive polarity side control circuit and a circuit delay of the negative polarity side control circuit may not match.

At this time, if the timing of the control signal on a positive polarity side and the timing of the control signal on a negative polarity side are not synchronized, a signal noise or power consumption may increase in drive control with the drive circuit due to generation of a through current in the drive circuit, or coping with a high drive frequency may be limited by lengthening a period for driving one end of the switch to 0 V to prevent the element from exceeding the withstand voltage at the time of polarity switching.

Therefore, the disclosure provides a signal level conversion circuit that can convert an input voltage signal of a low voltage into a high voltage signal of a first polarity and a high voltage signal of a second polarity and can output them at a synchronized timing using a switch element having an element withstand voltage lower than an output voltage range, a drive circuit including the signal level conversion circuit, a display driver, and a display device.

SUMMARY

A signal level conversion circuit according to the disclosure is a signal level conversion circuit that level-shifts an amplitude of an input voltage signal and includes: a first level shift part that generates a voltage signal obtained by converting the amplitude of the input voltage signal into an amplitude between a first power supply voltage having a first polarity with respect to a predetermined reference power supply voltage and a second power supply voltage of a second polarity having a polarity opposite to the first polarity with respect to the reference power supply voltage; a second level shift part that generates a signal obtained by converting the amplitude of the voltage signal into an amplitude between the reference power supply voltage and the first power supply voltage as a first polarity voltage signal; and a third level shift part that outputs a signal obtained by converting the amplitude of the first polarity voltage signal into an amplitude between a third power supply voltage of a first polarity of which a voltage difference from the reference power supply voltage is larger than that of the first power supply voltage and the reference power supply voltage as a high voltage signal of a first polarity. Alternatively, the signal level conversion circuit further includes a fourth level shift part that generates a signal obtained by converting the amplitude of the voltage signal generated by the first level shift part into an amplitude between the reference power supply voltage and the second power supply voltage as a second polarity voltage signal; and a fifth level shift part that outputs a signal obtained by converting the amplitude of the second polarity voltage signal into an amplitude between a fourth power supply voltage of a second polarity of which a voltage difference from the reference power supply voltage is larger than that of the second power supply voltage and the reference power supply voltage as a high voltage signal of a second polarity.

Further, a signal level conversion circuit according to the disclosure is a signal level conversion circuit that level-shifts amplitudes of first and second input voltage signals and includes a first level shift part that generates a first voltage signal obtained by converting the amplitude of the first input voltage signal into an amplitude between a first power supply voltage having a first polarity with respect to a predetermined reference power supply voltage and a second power supply voltage of a second polarity having a polarity opposite to the first polarity with respect to the reference power supply voltage; a second level shift part that generates a signal obtained by converting the amplitude of the first voltage signal into an amplitude between the reference power supply voltage and the first power supply voltage as a first polarity voltage signal; a third level shift part that outputs a signal obtained by converting the amplitude of the first polarity voltage signal into an amplitude between a third power supply voltage of a first polarity of which a voltage difference from the reference power supply voltage is larger than that of the first power supply voltage and the reference power supply voltage as a high voltage signal of a first polarity; a fourth level shift part that generates a second voltage signal obtained by converting the amplitude of the second input voltage signal into an amplitude between the first power supply voltage and the second power supply voltage; a fifth level shift part that generates a signal obtained by converting the amplitude of the second voltage signal into an amplitude between the reference power supply voltage and the second power supply voltage as a second polarity voltage signal; and a sixth level shift part that outputs a signal obtained by converting the amplitude of the second polarity voltage signal into an amplitude between a fourth power supply voltage of a second polarity of which a voltage difference from the reference power supply voltage is larger than that of the second power supply voltage and the reference power supply voltage as a high voltage signal of a second polarity.

A drive circuit according to the disclosure is a drive circuit of which a drive timing is controlled based on a low voltage control signal group and which outputs a high voltage first polarity drive voltage signal having a first polarity with respect to a predetermined reference power supply voltage from an output terminal during load drive, the drive circuit including: an output part that receives a high voltage input signal of a first polarity and outputs the first polarity drive voltage signal obtained by amplifying the high voltage input signal of a first polarity to a first node according to a high voltage control signal of a first polarity; a first conductivity type transistor switch which causes a voltage of the first node to be supplied to the output terminal when the first conductivity type transistor switch is in an on state and cuts off a connection between the first node and the output terminal when the first conductivity type transistor switch is in an off state; a control part that causes a high voltage output control signal of a second polarity for performing on-and-off control on the first conductivity type transistor switch to be supplied to a control end of the first conductivity type transistor switch according to a high voltage control signal having a second polarity with respect to the reference power supply voltage; and a signal level conversion part that includes first and second signal level conversion circuits, wherein the first signal level conversion circuit supplies a signal generated by once converting an amplitude of a first control signal of the low voltage control signal group into an amplitude between a first power supply voltage of a first polarity and a second power supply voltage of a second polarity and then by converting the once converted amplitude of the first control signal into an amplitude between a third power supply voltage of a first polarity of which a voltage difference from the reference power supply voltage is larger than that of the first power supply voltage and the reference power supply voltage to the first output part as the first high voltage control signal of a first polarity, and wherein the second signal level conversion circuit supplies a signal generated by once converting an amplitude of a second control signal of the low voltage control signal group into an amplitude between the first power supply voltage of a first polarity and the second power supply voltage of a second polarity and then by converting the once converted amplitude of the second control signal into an amplitude between a fourth power supply voltage of a second polarity of which a voltage difference from the reference power supply voltage is larger than that of the second power supply voltage and the reference power supply voltage to the first control part as the first high voltage control signal of a second polarity.

Further, a drive circuit of the disclosure is a drive circuit of which a drive timing is controlled based on a low voltage control signal group and which selects one of a high voltage first polarity drive voltage signal having a first polarity and a high voltage second polarity drive voltage signal having a second polarity with respect to a predetermined reference power supply voltage and outputs the selected one signal from an output terminal during load drive, the drive circuit including: a first output part that receives a high voltage input signal of a first polarity and outputs the first polarity drive voltage signal obtained by amplifying the high voltage input signal of a first polarity to a first node according to a first high voltage control signal of a first polarity; a first conductivity type transistor switch which causes a voltage of the first node to be supplied to the output terminal when the first conductivity type transistor switch is in an on state and cuts off a connection between the first node and the output terminal when the first conductivity type transistor switch is in an off state; a first control part that causes a high voltage output control signal of a second polarity for performing on-and-off control on the first conductivity type transistor switch to be supplied to a control end of the first conductivity type transistor switch according to a first high voltage control signal of a second polarity; a second output part that receives a high voltage input signal of a second polarity and outputs the second polarity drive voltage signal obtained by amplifying the high voltage input signal of a second polarity to a second node according to a second high voltage control signal of a second polarity; a second conductivity type transistor switch which causes a voltage of the second node to be supplied to the output terminal when the second conductivity type transistor switch is in an on state and cuts off a connection between the second node and the output terminal when the second conductivity type transistor switch is in an off state; a second control part that causes a high voltage output control signal of a first polarity for performing on-and-off control on the second conductivity type transistor switch to be supplied to a control end of the second conductivity type transistor switch according to a second high voltage control signal of a first polarity; and a signal level conversion part that includes first to fourth signal level conversion circuits, wherein the first signal level conversion circuit supplies a signal generated by once converting an amplitude of a first control signal of the low voltage control signal group into an amplitude between a first power supply voltage of a first polarity and a second power supply voltage of a second polarity and then by converting the once converted amplitude of the first control signal into an amplitude between a third power supply voltage of a first polarity of which a voltage difference from the reference power supply voltage is larger than that of the first power supply voltage and the reference power supply voltage to the first output part as the first high voltage control signal of a first polarity, wherein the second signal level conversion circuit supplies a signal generated by once converting an amplitude of a second control signal of the low voltage control signal group into an amplitude between the first power supply voltage of a first polarity and the second power supply voltage of a second polarity and then by converting the once converted amplitude of the second control signal into an amplitude between a fourth power supply voltage of a second polarity of which a voltage difference from the reference power supply voltage is larger than that of the second power supply voltage and the reference power supply voltage to the first control part as the first high voltage control signal of a second polarity, wherein the third signal level conversion circuit supplies a signal generated by once converting an amplitude of a third control signal of the low voltage control signal group into an amplitude between the first power supply voltage of a first polarity and the second power supply voltage of a second polarity and then by converting the once converted amplitude of the third control signal into an amplitude between the fourth power supply voltage of a second polarity and the reference power supply voltage to the second output part as the second high voltage control signal of a second polarity, and wherein the fourth signal level conversion circuit supplies a signal generated by once converting an amplitude of a fourth control signal of the low voltage control signal group into an amplitude between the first power supply voltage of a first polarity and the second power supply voltage of a second polarity and then by converting the once converted amplitude of the fourth control signal into an amplitude between the third power supply voltage of a first polarity and the reference power supply voltage to the second control part as the second high voltage control signal of a first polarity.

Further, a display driver according to the disclosure includes: a data register latch that captures a series of pieces of pixel data that represent a brightness level of each pixel based on a video signal and outputs a plurality of the captured pieces of pixel data; a plurality of level shift circuit groups that each converts a signal level of one of the plurality of pieces of pixel data output from the data register latch into one of a high voltage signal of a positive polarity and a high voltage signal of a negative polarity; a decoder part that converts each of the high voltage signal of a positive polarity and the high voltage signal of a negative polarity for each piece of pixel data into one of a gradation voltage signal of a positive polarity and a gradation voltage signal of a negative polarity; and a drive circuit group that outputs a signal obtained by alternately selecting the gradation voltage signal of a positive polarity and the gradation voltage signal of a negative polarity for each output channel as a drive voltage signal via an output terminal based on a low voltage control signal group for controlling a drive timing, wherein the drive circuit group includes a signal level conversion part to which a drive reference power supply voltage, a low voltage positive polarity power supply voltage and a high voltage positive polarity power supply voltage having a positive polarity with respect to the reference power supply voltage, and a low voltage negative polarity power supply voltage and a high voltage negative polarity power supply voltage having a negative polarity with respect to the reference power supply voltage are supplied and which converts a voltage amplitude of the low voltage control signal group to generate a high voltage control signal group, all drive circuits of the drive circuit group are constituted by transistors each having an element withstand voltage lower than a voltage difference between the high voltage positive polarity power supply voltage and high voltage negative polarity power supply voltage, and each drive circuit of the drive circuit group is the above-described drive circuit according to the disclosure.

Further, a display device according to the disclosure includes: the above-described display driver according to the disclosure; and a liquid crystal display panel which is driven according to the drive voltage signal output from the output terminal for each output channel of the display driver.

DESCRIPTION OF THE EMBODIMENTS

Example 1

Figure 1:
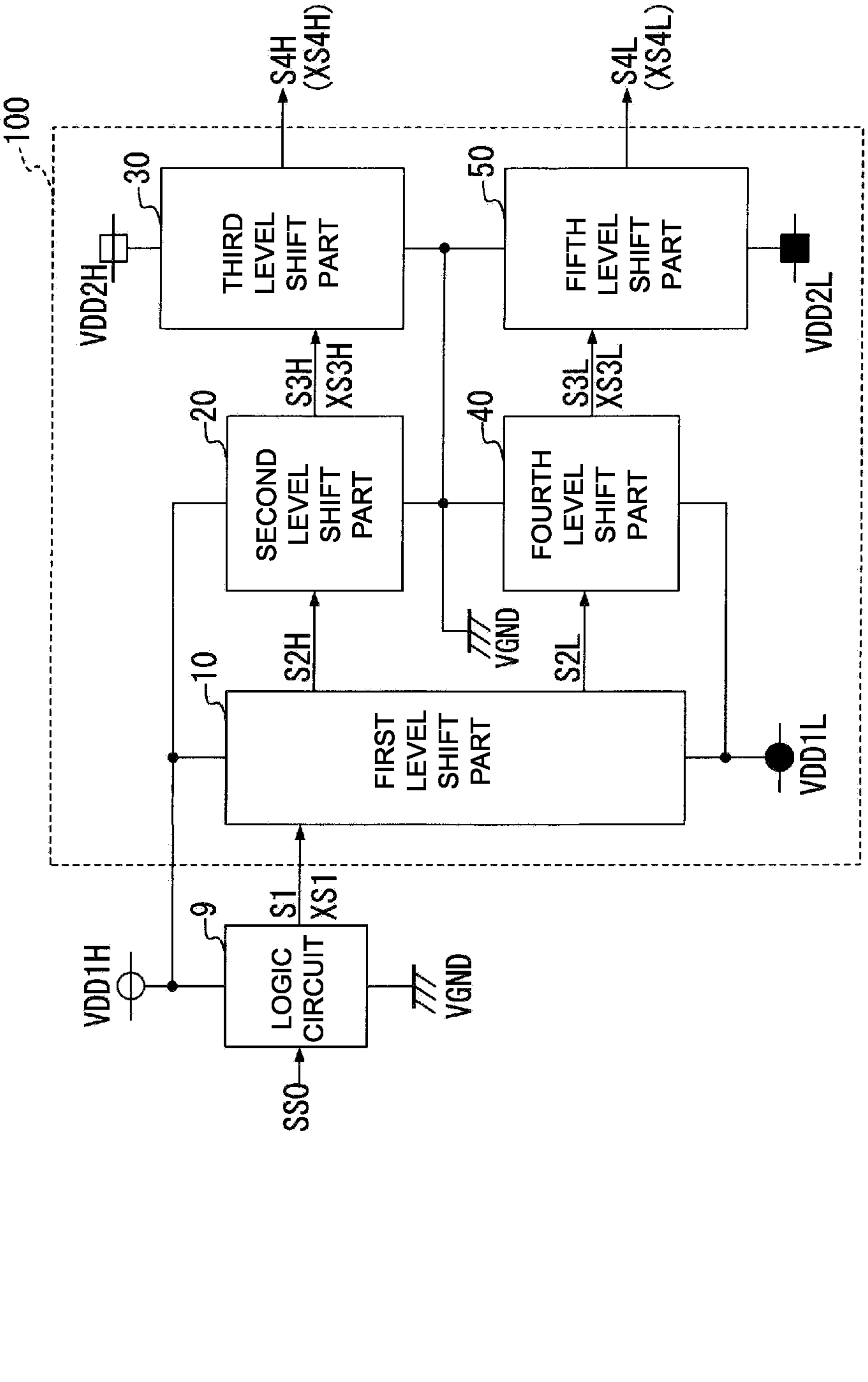
FIG. 1 is a block diagram showing an example of a configuration of a signal level conversion circuit 100 as a first example according to the disclosure.

FIG. 1 is a block diagram showing an example of a configuration of a signal level conversion circuit 100 as a first example according to the disclosure.

The signal level conversion circuit 100 receives, for example, a voltage signal S1 of a first polarity (a positive polarity) and a complementary signal XS1 obtained by inverting a phase of the voltage signal S1 which are output by a logic circuit 9 based on an input voltage signal SS0. Hereinafter, since each of the voltage signals SS0, S1 and XS1 is a low voltage signal for a logic circuit, they are also referred to as low voltage (LV) voltage signals SS0, S1 and XS1. Further, in the signal level conversion circuit 100, with a reference power supply voltage VGND as a reference, a voltage equal to or higher than the reference power supply voltage VGND is set as a first polarity (a positive polarity), and a voltage equal to or lower than the reference power supply voltage VGND is set as a second polarity (a negative polarity). The signal level conversion circuit 100 is supplied with a plurality of power supply voltages (VDD2L, VDD1L, VGND, VDD1H, and VDD2H) having the following magnitude relationships. Hereinafter, the reference power supply voltage VGND will be described as 0V in each example.

$$VDD2L<VDD1L<VGND<VDD1H<VDD2H$$

$$(VDD1H-VDD1L)\leq VDD2H$$

$$(VDD1H-VDD1L)\leq|VDD2L|$$

Hereinafter, the power supply voltages VDD1H and VDD1L are also referred to as LV power supply voltages, and the power supply voltages VDD2H and VDD2L are also referred to as high voltage (HV) power supply voltages because they are higher than the LV power supply voltages.

The signal level conversion circuit 100 receives the LV voltage signal S1 and its complementary signal XS1 and converts the LV voltage signal S1 into a voltage signal (hereinafter referred to as an HV voltage signal) of the high voltage (VDD2H) of a first polarity (a positive polarity) and an HV voltage signal of the high voltage (VDD2L) of a second polarity (a negative polarity). As withstand voltages (normally used withstand voltages) of each element constituting the level conversion circuit 100, those satisfying the following relationships are employed, and here, a withstand voltage of a low voltage element is set as VDD1M and a withstand voltage of a high voltage element is set as VDD2M.

$$VDD1M\approx VDD1H+\Delta 1$$

$$VDD1M\approx|VDD1L|-\Delta 1$$

$$VDD2M\approx VDD2H+\Delta 2$$

$$VDD2M\approx|VDD2L|+\Delta 2$$

Δ1, Δ2: Voltage margin

As shown in FIG. 1, the signal level conversion circuit 100 includes a first level shift part 10, a second level shift part 20, a third level shift part 30, a fourth level shift part 40, and a fifth level shift part 50.

The first level shift part 10 converts the LV voltage signals S1 and XS1 having an amplitude (VDD1H to VGND) into voltage signals having an amplitude (VDD1L to VDD1H) obtained by level-shifting the amplitude (VDD1H to VGND) to expand to a second polarity (a negative polarity) side with the reference power supply voltage VGND as a reference. Specifically, the first level shift part 10 converts the LV voltage signals S1 and XS1 into a voltage signal S2H (VDD1L, VDD1H) for a first polarity (a positive polarity) and an HV voltage signal S2L for a second polarity (a negative polarity). The first level shift part 10 supplies the voltage signal S2H to a second level shift part 20 and supplies the voltage signal S2L to the fourth level shift part 40.

The second level shift part 20 converts the voltage signal S2H having the amplitude (VDD1L to VDD1H) which is supplied from the first level shift part 10 into a voltage signal S3H and its complementary signal XS3H of a first polarity (a positive polarity) having an amplitude (VGND to VDD1H) obtained by level-shifting the amplitude (VDD1L to VDD1H) with the reference power supply voltage VGND as a reference and supplies the voltage signals S3H and XS3H to the third level shift part 30.

The third level shift part 30 converts the voltage signals S3H and XS3H having the amplitude (VGND to VDD1H) into an HV voltage signal S4H and its complementary signal XS4H of a first polarity (a positive polarity) having an amplitude (VGND to VDD2H) obtained by level-shifting the amplitude (VGND to VDD1H) to expand to a first polarity (a positive polarity) side with the reference power supply voltage VGND as a reference and outputs one or both of the HV voltage signals S4H and XS4H.

The fourth level shift part 40 converts the voltage signal S2L having the amplitude (VDD1L to VDD1H) which is supplied from the first level shift part 10 into a voltage signal S3L and its complementary signal XS3L having an amplitude (VGND to VDD1L) obtained by level-shifting the amplitude (VDD1L to VDD1H) with the reference power supply voltage VGND as a reference and supplies the voltage signals S3L and XS3L to the fifth level shift part 50.

The fifth level shift part 50 converts the voltage signals S3L and XS3L having the amplitude (VGND to VDD1L) into an HV voltage signal S4L and its complementary signal XS4L of a second polarity (a negative polarity) having an amplitude (VGND to VDD2L) obtained by level-shifting the amplitude (VGND to VDD1L) to expand to a second polarity (a negative polarity) side with the reference power supply voltage VGND as a reference and outputs one or both of the HV voltage signals S4L and XS4L.

As described above, in the signal level conversion circuit 100 shown in FIG. 1, the amplitude of the LV voltage signals S1 and XS1 which are signal level conversion targets is expanded to a negative polarity side by the first level shift part 10, and thus the voltage signals S2H and S2L having the amplitude of VDD1H to VDD1L extending from the negative polarity to the positive polarity are obtained. At this time, the voltage signals S2H and S2L which are supplied from the first level shift part 10 may be either in-phase signals or complementary signals. The voltage signal S2H is output as a voltage signal for a first polarity (a positive polarity), and the voltage signal S2L is output as a voltage signal for a second polarity (a negative polarity).

Then, the voltage signal S2H for a first polarity (a positive polarity) is converted into the HV voltage signal S4H (XS4H) of a first polarity (a positive polarity) having the amplitude of VGND to VDD2H obtained by level-shifting the amplitude of the voltage signal S2H by the level shift parts (20 and 30) for a first polarity. Further, the voltage signal S2L for a second polarity (a negative polarity) is converted into the HV voltage signal S4L (XS4L) of a second polarity (a negative polarity) having the amplitude of VGND to VDD2L obtained by level-shifting the amplitude of the voltage signal S2L by the level shift parts (40 and 50) for a second polarity.

In short, the signal level conversion circuit 100 level-converts an input voltage signal of a low voltage into a high voltage signal of a first polarity and a high voltage signal of a second polarity by the following first to fifth level shift parts. That is, the first level shift part (10) generates the voltage signals (S2H and S2L) obtained by converting the amplitude of each of the input voltage signals (S1 and XS1) into an amplitude between a first negative polarity power supply voltage (VDD1L) of a negative polarity and a first positive polarity power supply voltage (VDD1H) of a positive polarity. The second level shift part (20) generates signals obtained by converting the amplitude of the voltage signal (S2H) described above into an amplitude between the predetermined reference power supply voltage (VGND) and the first positive polarity power supply voltage (VDD1H) as the first polarity voltage signals (S3H and XS3H). The third level shift part (30) outputs signals obtained by converting the amplitude of each of the first polarity voltage signals (S3H and XS3H) into an amplitude between a second positive polarity power supply voltage (VDD2H) higher than the first positive polarity power supply voltage (VDD1H) and the reference voltage as the high voltage signals (S4H and XS4H) of a first polarity. The fourth level shift part (40) generates signals obtained by converting the amplitude of the voltage signal (S2L) into an amplitude between the reference power supply voltage (VGND) and the first negative polarity power supply voltage (VDD1L) as the second polarity voltage signals (S3L and XS3L). The fifth level shift part (50) outputs signals obtained by converting the amplitude of each of the second polarity voltage signals (S3L and XS3L) into an amplitude between a second negative polarity power supply voltage (VDD2L) lower than the first negative polarity power supply voltage (VDD1L) and the reference power supply voltage as the high voltage signals (S4L and XS4L) of a second polarity. In this way, the signal level conversion circuit 100 once converts the input voltage signal of a low voltage into the voltage signals S2H and S2L having an amplitude between VDD1L and VDD1H extending from a negative polarity to a positive polarity in the first level shift part (10). Further, the signal level conversion circuit 100 includes level shift parts (20, 30, 40, and 50) that symmetrically expand the amplitude of the voltage signals S2H and S2L to a positive polarity side and a negative polarity side with respect to the reference power supply voltage VGND.

According to this configuration, the signal level conversion circuit 100 can match the amplitude conversion processing times (timings) of the high voltage signals (S4H and XS4H) of a first polarity and the high voltage signals (S4L and XS4L) of a second polarity of which the amplitudes are expanded with respect to the voltage signals (S1 and XS1) of a low voltage. Further, it is possible to suppress a fluctuation in the amplitude conversion processing time (timing) with respect to a characteristic fluctuation due to the manufacturing process of the elements constituting the signal level conversion circuit 100, the environmental temperature, and the like. It is preferable that the power supply voltage VDD1H on a positive polarity side and the power supply voltage VDD1L on the negative polarity side have the same voltage difference from the reference power supply voltage VGND. Further, it is preferable that the power supply voltage VDD2H on a positive polarity side and the power supply voltage VDD2L on the negative polarity side also have the same voltage difference from the reference power supply voltage VGND.

Further, each of the first to fifth level shift parts 10 to 50 can be constituted by transistors each having an element withstand voltage (for example, about ½ of a power supply voltage range (VDD2L to VDD2H) extending from a positive polarity to a negative polarity) lower than the power supply voltage range (VDD2L to VDD2H) from the high voltage signal (S4L) of a negative polarity to the high voltage signal (S4H) of a positive polarity.

Therefore, according to the signal level conversion circuit 100 shown in FIG. 1, it is possible to level-convert the LV voltage signal S1 into the HV voltage signal S4H of a first polarity (a positive polarity) and the HV voltage signal S4L of a second polarity (a negative polarity) and to output them at a synchronized timing using the transistor having an element withstand voltage lower than an output voltage range.

In FIG. 1, a configuration example in which the first, third, and fifth level shift parts 10, 30, and 50 receive two signals complementary to each other and perform the amplitude conversion is illustrated, but they may be configured to receive only one of the two signals.

The level shift parts (20 and 30) for a first polarity or the level shift parts (40 and 50) for a second polarity shown in FIG. 1 may be provided with a function for adjusting the output timings of both.

In the signal level conversion circuit 100 shown in FIG. 1, one LV voltage signal S1 (XS1) is targeted for the signal level conversion, but the configuration may be expanded such that two or three or more LV voltage signals are targeted for the conversion and each of the LV voltage signals is level-converted into HV voltage signals of a first polarity (a positive polarity) and a second polarity (a negative polarity). For high voltage signal groups of a first polarity and a second polarity of which the amplitude is expanded by the signal level conversion circuit 100 with respect to a plurality of different voltage signals of a low voltage, it is also possible to suppress the influence of the element characteristic fluctuation such as the manufacturing process and the environmental temperature and to match amplitude conversion processing times (timings) between the polarities and the high voltage signal groups.

Further, if necessary, the first level shift part 10 may be provided with a logic circuit that generates a control signal for synchronously controlling the level shift parts (20 and 30) for a first polarity and the level shift parts (40 and 50) for a second polarity. Further, to deal with excessive variation in element characteristics, the signal level conversion circuit 100 may be provided with a function of correcting a timing deviation between the HV voltage signals S4H and S4L with a control signal from the outside of the signal level conversion circuit 100.

Figure 2A:
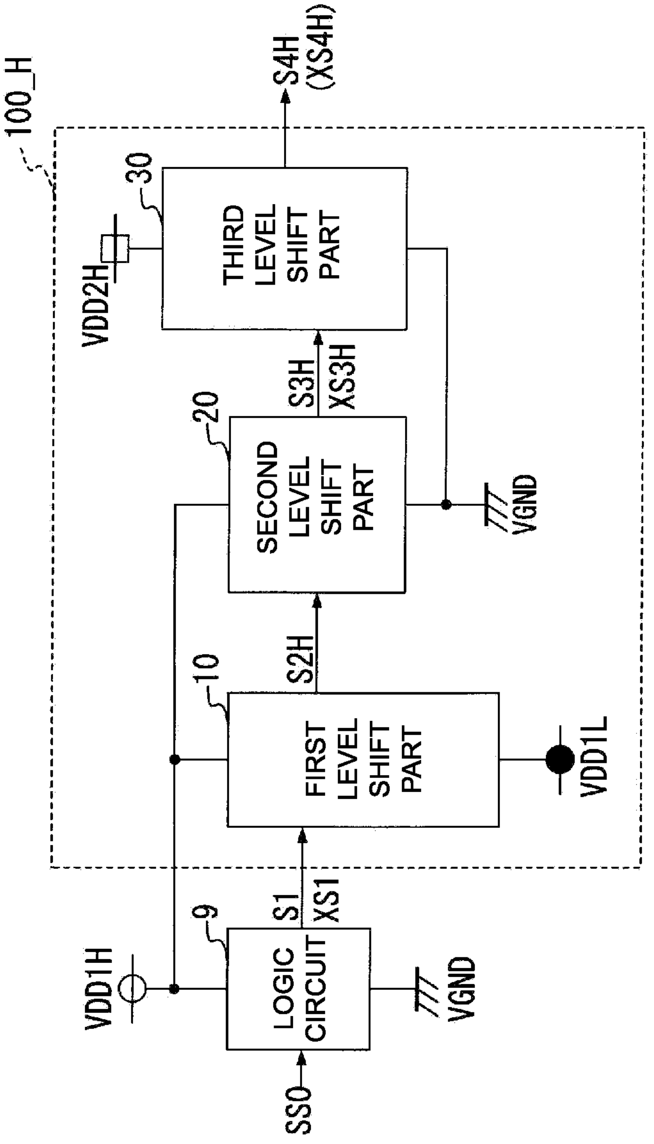
FIG. 2A is a block diagram showing a modification example 100_H of the signal level conversion circuit 100 of the first example according to the disclosure.
Figure 2B:
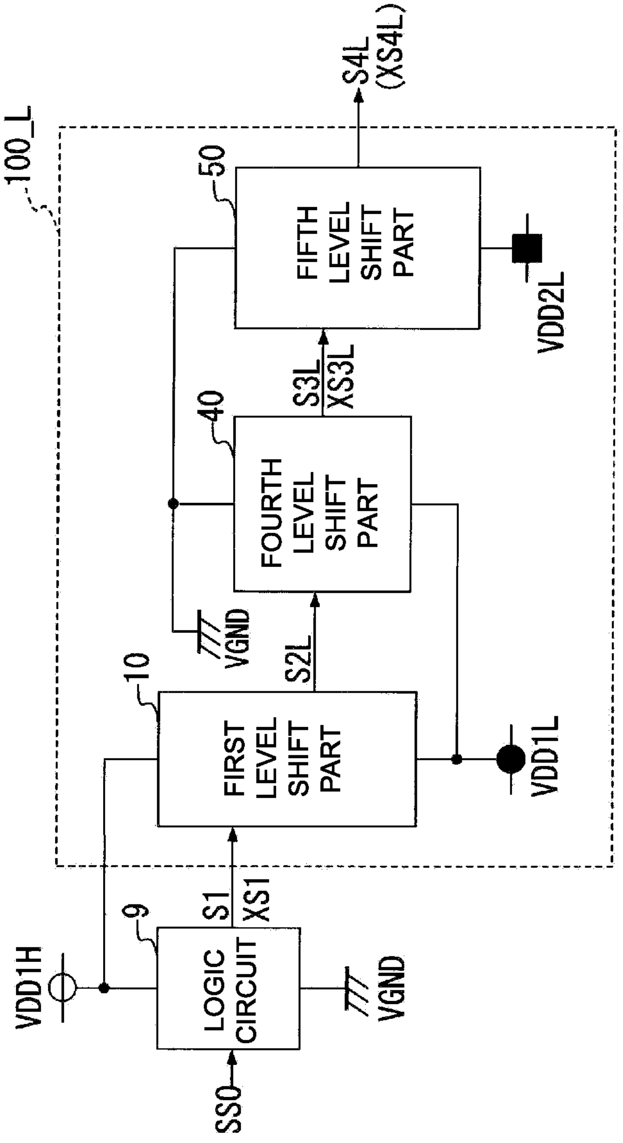
FIG. 2B is a block diagram showing another modification example 100_L of the signal level conversion circuit 100 of the first example according to the disclosure.

Further, modification examples of the signal level conversion circuit 100 of FIG. 1 are shown in FIGS. 2A and 2B. FIG. 2A is a signal level conversion circuit 100_H from which the fourth and fifth level shift parts 40 and 50 have been removed from FIG. 1. The signal level conversion circuit 100_H of FIG. 2A level-converts the voltage signals S1 and XS1 of a low voltage into the high voltage signal S4H (XS4H) having the first polarity (a positive polarity). Further, FIG. 2B is a signal level conversion circuit 100_L from which the second and third level shift parts 20 and 30 have been removed from FIG. 1. The signal level conversion circuit 100_L of FIG. 2B level-converts the voltage signals S1 and XS1 of a low voltage into the high voltage signal S4L (XS4L) having the second polarity (a negative polarity).

The signal level conversion circuits 100_H and 100_L of FIGS. 2A and 2B can be used in a case in which the amplitude of the voltage signal of a low voltage is expanded to only one of the positive polarity side and the negative polarity side. In a case in which a plurality of high voltage signal groups (for example, timing control signal groups) for each polarity is generated from a plurality of different voltage signal groups of a low voltage, the plurality of high voltage signals is generated using the signal level conversion circuits 100, 100_H, and 100_L, and thus it is possible to generate the high voltage signal groups of which the amplitude is expanded while the timing between the plurality of different voltage signal groups of a low voltage is maintained. For the high voltage signal groups of a first polarity and a second polarity generated in this way, it is possible to suppress the influence of fluctuations in the element characteristics and to match the amplitude conversion processing times (timings) between the polarities and the high voltage signal groups.

Example 2

Figure 3:
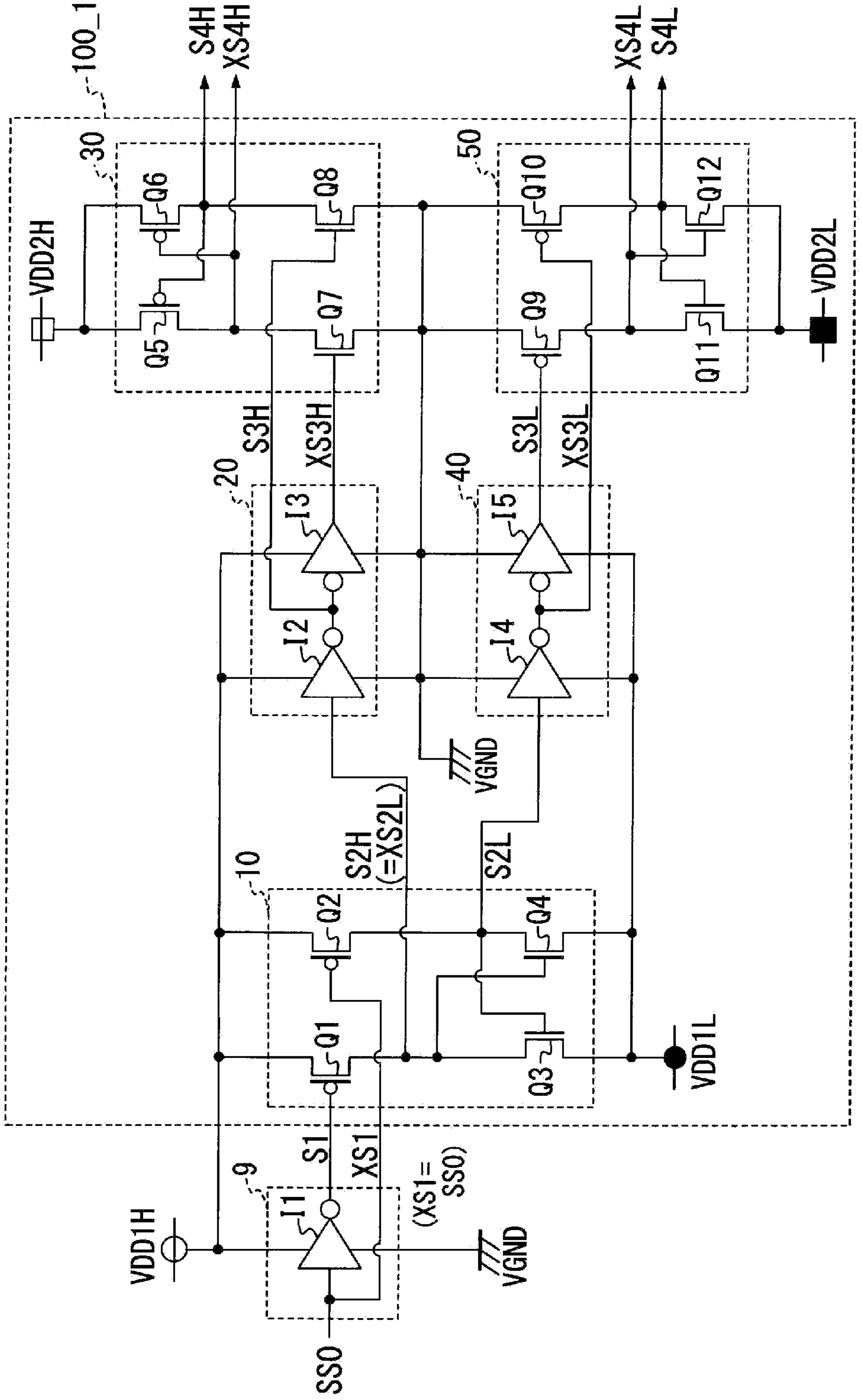
FIG. 3 is a circuit diagram showing a configuration of a signal level conversion circuit 100_1 as a second example according to the disclosure.

FIG. 3 is a circuit diagram showing a configuration of a signal level conversion circuit 100_1 as a second example according to the disclosure.

FIG. 3 shows a specific circuit example of each of a first level shift part 10, a second level shift part 20, a third level shift part 30, a fourth level shift part 40, and a fifth level shift part 50 of the signal level conversion circuit 100 shown in FIG. 1. In FIG. 3, for convenience, a configuration to generate the HV voltage signal (S4H, XS4H) of a first polarity (a positive polarity) and the HV voltage signal (S4L, XS4L) of a second polarity (a negative polarity) with respect to one LV voltage signal SS0 is shown.

In FIG. 3, the logic circuit 9 includes an inverter I1 that outputs a signal obtained by inverting a logic level of the LV voltage signal SS0 as the LV voltage signal S1. The first level shift part 10 of the signal level conversion circuit 100_1 receives the LV voltage signal S1 output from the inverter I1 and its complementary signal XS1 (=SS0). The logic circuit 9 in FIG. 3 has a configuration of only the inverter I1 for convenience, but may have any configuration that outputs the LV voltage signals S1 and XS1.

The first level shift part 10 includes PMOS transistors Q1 and Q2 that receive the power supply voltage VDD1H of a first polarity (a positive polarity) at each source and NMOS transistors Q3 and Q4 that receive the power supply voltage VDD1L of a negative polarity at each source.

A drain of the PMOS transistor Q1 is connected to a drain of the NMOS transistor Q3 and a gate of the NMOS transistor Q4. The LV voltage signal S1 output from the logic circuit 9 is supplied to the gate of the PMOS transistor Q1. A drain of the PMOS transistor Q2 is connected to a drain of the NMOS transistor Q4 and a gate of the NMOS transistor Q3. The LV voltage signal XS1 is supplied to a gate of the PMOS transistor Q2.

With this configuration, the first level shift part 10 outputs a signal generated at a connection point between the drain of the PMOS transistor Q2 and the drain of the NMOS transistor Q4 as the voltage signal S2L for a negative polarity. Further, the first level shift part 10 outputs a signal generated at a connection point between the drain of the PMOS transistor Q1 and the drain of the NMOS transistor Q3, that is, the complementary signal obtained by inverting the phase of the voltage signal S2L, as the voltage signal S2H. The voltage signals S2L and S2H do not have to be complementary signals to each other. For example, either the signal generated at the connection point between the drain of the PMOS transistor Q2 and the drain of the NMOS transistor Q4 or the signal generated at the connection point between the drain of the PMOS transistor Q1 and the drain of the NMOS transistor Q3 may be output as a common voltage signal S2L or S2H.

The second level shift part 20 includes inverters I2 and I3 connected in series. The inverters I2 and I3 receive the power supply voltage VDD1H of a first polarity (a positive polarity) and the reference power supply voltage VGND.

The inverter I2 receives the voltage signal S2H, and in a case in which the voltage signal S2H represents the power supply voltage VDD1H of a first polarity (a positive polarity), the inverter I2 outputs a signal representing the reference power supply voltage VGND. On the other hand, in a case in which the voltage signal S2H represents the power supply voltage VDD1L of a second polarity (a negative polarity), the inverter I2 outputs a signal representing the power supply voltage VDD1H of a first polarity (a positive polarity). The inverter I2 supplies the signal output as described above to the inverter I3 and the third level shift part 30 as the voltage signal S3H. The inverter I3 supplies the complementary signal obtained by inverting the phase of the voltage signal S3H to the third level shift part 30 as the voltage signal XS3H.

The fourth level shift part 40 includes inverters I4 and I5 connected in series. The inverters I4 and I5 receive the reference power supply voltage VGND and the power supply voltage VDD1L of a second polarity (a negative polarity).

The inverter I4 receives the voltage signal S2L, and in a case in which the voltage signal S2L represents the power supply voltage VDD1H of a first polarity (a positive polarity), the inverter I4 outputs a signal representing the power supply voltage VDD1L of a second polarity (a negative polarity). In a case in which the voltage signal S2L represents the power supply voltage VDD1L of a second polarity (a negative polarity), the inverter I4 outputs a signal representing the reference power supply voltage VGND. The inverter I4 supplies the signal output as described above to the inverter I5 and the fifth level shift part 50 as the voltage signal XS3L. The inverter I5 supplies the complementary signal obtained by inverting the phase of the voltage signal XS3L to the fifth level shift part 50 as the voltage signal S3L.

The third level shift part 30 includes PMOS transistors Q5 and Q6 that receive the power supply voltage VDD2H of a first polarity (a positive polarity) at each source and NMOS transistors Q7 and Q8 that receive the reference power supply voltage VGND at each source.

A drain of the PMOS transistor Q5 is connected to a gate of the PMOS transistor Q6 and a drain of the NMOS transistor Q7. A drain of the PMOS transistor Q6 is connected to a gate of the PMOS transistor Q5 and a drain of the NMOS transistor Q8. The voltage signal XS3H output from the second level shift part 20 is supplied to a gate of the NMOS transistor Q7. The voltage signal S3H output from the second level shift part 20 is supplied to a gate of the NMOS transistor Q8.

With this configuration, the third level shift part 30 outputs a signal generated at a connection point between the drain of the PMOS transistor Q6 and the drain of the NMOS transistor Q8 as the HV voltage signal S4H of a first polarity (a positive polarity). Further, the third level shift part 30 outputs a signal generated at a connection point between the drain of the PMOS transistor Q5 and the drain of the NMOS transistor Q7 as the HV voltage signal XS4H of a first polarity (a positive polarity) obtained by inverting the phase of the HV voltage signal S4H.

The fifth level shift part 50 includes PMOS transistors Q9 and Q10 that receive the reference power supply voltage VGND at each source and NMOS transistors Q11 and Q12 that receive the power supply voltage VDD2L of a second polarity (a negative polarity) at each source.

A drain of the PMOS transistor Q9 is connected to a gate of the NMOS transistor Q12 and a drain of the NMOS transistor Q11. A drain of the PMOS transistor 10 is connected to a gate of the NMOS transistor Q11 and a drain of the NMOS transistor Q12. The voltage signal S3L output from the fourth level shift part 40 is supplied to a gate of the NMOS transistor Q9. The voltage signal XS3L output from the fourth level shift part 40 is supplied to a gate of the NMOS transistor Q10.

With this configuration, the fifth level shift part 50 outputs a signal generated at a connection point between the drain of the PMOS transistor Q10 and the drain of the NMOS transistor Q12 as the HV voltage signal S4L of a second polarity (a negative polarity). Further, the fifth level shift part 50 outputs a signal generated at a connection point between the drain of the PMOS transistor Q9 and the drain of the NMOS transistor Q11 as the HV voltage signal XS4L of a second polarity (a negative polarity) obtained by inverting the phase of the HV voltage signal S4L.

With such a configuration, it is possible to suppress the timing deviation of the HV voltage signal between the polarities due to the characteristic variation of the NMOS transistor and the PMOS transistor constituting each level shift part, the fluctuation of a temperature condition, and the like. Therefore, it is possible to convert the LV voltage signals S1 and XS1 into the HV voltage signals (S4H, XS4H) of a first polarity (a positive polarity) and the HV voltage signals (S4L, XS4L) of a second polarity (a negative polarity) and to output them at a synchronized timing.

In the signal level conversion circuit 100_1 shown in FIG. 3, each of the first level shift part 10, the third level shift part 30, and the fifth level shift part 50 as level shift parts for expanding the voltage amplitude of the input LV voltage signals (S1, XS1) is constituted by four elements of MOS transistors, but other configurations may be employed. Further, the second level shift part 20 and the fourth level shift part 40 are preferably symmetrical with respect to the reference power supply voltage VGND, and the third level shift part 30 and the fifth level shift part 50 are also preferably symmetrical with respect to the reference power supply voltage VGND. Specifically, as shown in a configuration example of FIG. 3, it is preferable that the fourth level shift part 40 be configured such that the power supply voltage VDD1H of a first polarity (a positive polarity) which is supplied to the second level shift part 20 is replaced with the power supply voltage VDD1L of a second polarity (a negative polarity) and a conductivity type of a transistor constituting the second level shift part 20 is replaced. Similarly, it is preferable that the fifth level shift part 50 be also configured such that the power supply voltage VDD2H of a first polarity (a positive polarity) which is supplied to the third level shift part 30 is replaced with the power supply voltage VDD2L of a second polarity (a negative polarity) and a conductivity type of a transistor constituting the fourth level shift part 40 is replaced. With such a configuration, it is possible to suppress the timing deviation of the HV voltage signal between the polarities at the time of converting the voltage amplitude. Therefore, it is easily possible to convert the LV voltage signals S1 and XS1 into the HV voltage signals (S4H, XS4H) of a first polarity (a positive polarity) and the HV voltage signals (S4L, XS4L) of a second polarity (a negative polarity) and to output them at a synchronized timing.

Example 3

Figure 4:
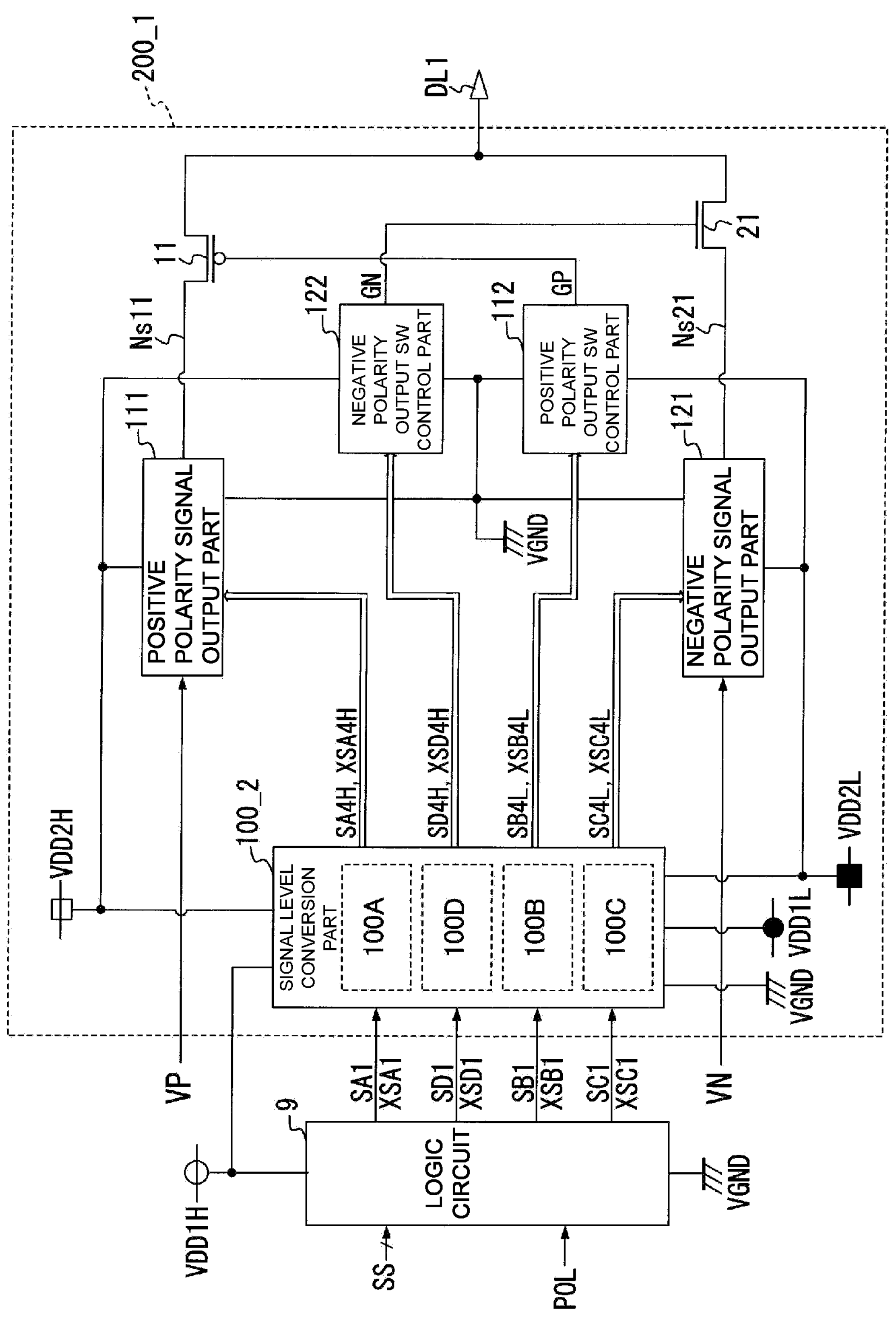
FIG. 4 is a block diagram showing a configuration of a drive circuit 200_1 as a third example according to the disclosure.

FIG. 4 is a block diagram showing a configuration of a drive circuit 200_1 as a third example according to the disclosure.

The drive circuit 200_1 receives a positive polarity high voltage input signal VP having a high voltage value (VGND to VDD2H) of a positive polarity and a negative polarity high voltage input signal VN having a high voltage value (VDD2L to VGND) of a negative polarity as high voltage input signals for driving a load. Then, the drive circuit 200_1 generates a LV voltage signal group SA1, SB1, SC1, and SD1 (VGND to VDD1H) required for the drive control of the drive circuit 200_1 and their respective complementary signals XSA1, XSB1, XSC1, and XSD1 in the logic circuit 9 to which a polarity switching signal POL indicating a polarity switching timing and a plurality of low voltage control signals SS for controlling the output timing are supplied, alternately switches positive polarity and negative polarity drive voltage signals VPA and VNA of a high voltage obtained by amplifying the above-mentioned positive polarity high voltage input signal VP and negative polarity high voltage input signal VN at a timing corresponding to the LV voltage signal group, and outputs them from an output terminal DL1. Further, the drive circuit 200_1 is constituted by transistors each having an element withstand voltage lower than an output voltage range (VDD2L to VDD2H) of the positive polarity and negative polarity drive voltage signals VPA and VNA which are output to the output terminal DL1.

As shown in FIG. 4, the drive circuit 200_1 includes a PMOS output switch 11, an NMOS output switch 21, a signal level conversion part 100_2, a positive polarity signal output part 111, a negative polarity signal output part 121, a positive polarity output SW control part 112, and a negative polarity output SW control part 122.

The signal level conversion part 100_2 includes the signal level conversion circuit shown in FIG. 1 (FIG. 3), FIG. 2A, and FIG. 2B as a system constituted by a plurality of circuits (100A, 100B, 100C, and 100D in FIG. 4) according to the type of control signal. The signal level conversion part 100_2 is supplied with a reference power supply voltage VGND, a power supply voltage VDD1H of a positive polarity, a power supply voltage VDD1L of a negative polarity, a power supply voltage VDD2H of a positive polarity of which a voltage difference with respect to the reference power supply voltage VGND is larger than that of the power supply voltage VDD1H, and a power supply voltage VDD2L of a negative polarity of which a voltage difference with respect to the power supply voltage VGND is larger than that of the power supply voltage VDD1L.

The signal level conversion circuit 100A level-shifts an amplitude of each of the LV voltage signals SA1 and XSA1 for timing control as described above. That is, the signal level conversion circuit 100A supplies a signal generated by once converting an amplitude of each of the LV voltage signals SA1 and XSA1 into an amplitude between the power supply voltage VDD1H of a positive polarity and the power supply voltage VDD1L of a negative polarity and then by converting the once converted amplitude of each of the LV voltage signals SA1 and XSA1 into an amplitude between the power supply voltage VDD2H of a positive polarity and the reference power supply voltage VGND to the positive polarity signal output part 111 as HV voltage signals SA4H and XSA4H of a positive polarity. The signal level conversion circuit 100B supplies a signal generated by once converting an amplitude of each of the LV voltage signals SB1 and XSB1 for timing control into an amplitude between the power supply voltage VDD1H of a positive polarity and the power supply voltage VDD1L of a negative polarity and then by converting the once converted amplitude of each of the LV voltage signals SB1 and XSB1 into an amplitude between the power supply voltage VDD2L of a negative polarity and the reference power supply voltage VGND to the positive polarity output SW control part 112 as HV voltage signals SB4L and XSB4L of a negative polarity. Further, the signal level conversion circuit 100C supplies a signal generated by once converting an amplitude of each of the LV voltage signals SC1 and XSC1 for timing control into an amplitude between the power supply voltage VDD1H of a positive polarity and the power supply voltage VDD1L of a negative polarity and then by converting the once converted amplitude of each of the LV voltage signals SC1 and XSC1 into an amplitude between the power supply voltage VDD2L of a negative polarity and the reference power supply voltage VGND to the negative polarity signal output part 121 as HV voltage signals SC4L and XSC4L of a negative polarity. Further, the signal level conversion circuit 100D supplies a signal generated by once converting an amplitude of each of the LV voltage signals SD1 and XSD1 for timing control into an amplitude between the power supply voltage VDD1H of a positive polarity and the power supply voltage VDD1L of a negative polarity and then by converting the once converted amplitude of each of the LV voltage signals SD1 and XSD1 into an amplitude between the power supply voltage VDD2H of a positive polarity and the reference power supply voltage VGND to the negative polarity output SW control part 122.

In the signal level conversion part 100_2 of FIG. 4, each of the signal level conversion circuits 100A to 100D is a signal level conversion circuit that converts an LV voltage signal into an HV voltage signal of a positive or negative polarity, and, for example, the signal level conversion circuits 100A and 100D can apply the configuration 100_H of FIG. 2A thereto, and the signal level conversion circuits 100B and 100C can apply the configuration 100_L of FIG. 2B thereto.

The positive polarity signal output part 111 receives the HV power supply voltage VDD2H of a first polarity (a positive polarity) and the reference power supply voltage VGND and operates within an HV voltage range (VGND to VDD2H) of a positive polarity. The positive polarity signal output part 111 supplies the positive polarity drive voltage signal VPA obtained by amplifying the positive polarity high voltage input signal VP to a source of the PMOS output switch 11 serving as the PMOS transistor via a node Ns11 according to the control timing of one or both of the HV voltage signals SA4H and XSA4H of a first polarity (a positive polarity).

The positive polarity output SW control part 112 receives the HV power supply voltage VDD2L of a second polarity (a negative polarity) and the reference power supply voltage VGND and operates within an HV voltage range (VDD2L to VGND) of a negative polarity. The positive polarity output SW control part 112 generates a high voltage output control signal GP of a negative polarity having at least two values (for example, VGND and VDD1L) capable of performing on-and-off control on the PMOS output switch 11 within a predetermined element withstand voltage with respect to the positive polarity drive voltage signal VPA and supplies the generated high voltage output control signal GP to a gate of the PMOS output switch 11 according to the control timing of one or both of the HV voltage signals SB4L and XSB4L of a second polarity (a negative polarity).

The PMOS output switch 11 is a PMOS transistor, and its own drain is connected to the output terminal DL1. The PMOS output switch 11 is set to an on state or an off state according to the positive polarity drive voltage signal VPA which is supplied to its own source and the high voltage output control signal GP of a negative polarity received at its own gate. When the PMOS output switch 11 is in an on state, the PMOS output switch 11 outputs the positive polarity drive voltage signal VPA supplied from the positive polarity signal output part 111 to the output terminal DL1. The drain, gate, and source (and back gate) of the PMOS output switch 11 are controlled within a voltage difference equal to or less than the element withstand voltage.

The negative polarity signal output part 121 receives the HV power supply voltage VDD2L of a second polarity (a negative polarity) and the reference power supply voltage VGND and operates within an HV voltage range (VDD2L to VGND) of a negative polarity. The negative polarity signal output part 121 supplies the negative polarity drive voltage signal VNA obtained by amplifying the negative polarity high voltage input signal VN to a source of the NMOS output switch 21 via a node Ns21 according to the control timing of one or both of the HV voltage signals SC4L and XSC4L of a second polarity (a negative polarity).

The negative polarity output SW control part 122 receives the HV power supply voltage VDD2H of a first polarity (a positive polarity) and the reference power supply voltage VGND and operates within an HV voltage range (VGND to VDD2H) of a positive polarity. The negative polarity output SW control part 122 generates a high voltage output control signal GN of a positive polarity having at least two values (for example, VGND and VDD1H) capable of performing on-and-off control on the NMOS output switch 21 within a predetermined element withstand voltage with respect to the negative polarity drive voltage signal VPA and supplies the generated high voltage output control signal GN to a gate of the NMOS output switch 21 according to the control timing of one or both of the HV voltage signals SD4H and XSD4H of a first polarity (a positive polarity).

The NMOS output switch 21 is an NMOS transistor, and its own drain is connected to the output terminal DL1. The NMOS output switch 21 is set to an on state or an off state according to the negative polarity drive voltage signal VNA which is supplied to its own source and the high voltage output control signal GN of a positive polarity received at its own gate. When the NMOS output switch 21 is in an on state, the NMOS output switch 21 outputs the negative polarity drive voltage signal VNA supplied from the negative polarity signal output part 121 to the output terminal DL1. The drain, gate, and source (and back gate) of the NMOS output switch 21 are controlled within a voltage difference equal to or less than the element withstand voltage.

With such a configuration, in the drive circuit 200_1, the polarity switching of the drive voltage signal to the output terminal DL1 by the positive polarity signal output part 111, the negative polarity signal output part 121, the positive polarity output SW control part 112, and the negative polarity output SW control part 122 is controlled with the HV voltage signal group (SA1, SB1, SC1, and SD1 and their respective complementary signals XSA1, XSB1, XSC1, and XSD1) from the signal level conversion circuit 100_2. Here, the signal level conversion circuit 100_2 can output each of HV voltage signal groups (SA4H and SB4H and their respective complementary signals) responsible for output control on the positive polarity side, HV voltage signal groups (SC4H and SD4H and their respective complementary signals) responsible for output control on the negative polarity side, and HV voltage signal groups between the positive polarity and the negative polarity at a synchronized timing.

Therefore, according to the drive circuit 200_1, in a drive circuit configured using transistors each having an element withstand voltage lower than an output voltage range (VDD2L to VDD2H), including the signal level conversion circuit 100_2, the drive timing deviation within the same polarity and between the polarities can be suppressed, and with this high-precision drive timing control, the negative polarity drive voltage signal VNA and the positive polarity drive voltage signal VPA can be alternately switched and output to a capacitive load connected to the output terminal DLL As a result, it is possible to suppress the generation of a through current and a signal noise due to the drive timing deviation, and it is possible to cope with a high drive frequency.

Detailed operations of the positive polarity output SW control part 112 that performs the on-and-off control on PMOS output switch 11 and the negative polarity output SW control part 122 that performs the on-and-off control on the NMOS output switch 21 will be described below.

In a case in which the PMOS output switch 11 outputs the positive polarity drive voltage signal VPA having a voltage value relatively close to the power supply voltage VDD2H to the output terminal DL1, the positive polarity output SW control part 112 supplies the high voltage output control signal GP of a negative polarity having the reference power supply voltage VGND to the gate of the PMOS output switch 11. Further, in a case in which the PMOS output switch 11 outputs the positive polarity drive voltage signal VPA having a voltage value relatively close to the reference power supply voltage VGND to the output terminal DL1, the positive polarity output SW control part 112 supplies the high voltage output control signal GP of a negative polarity having an intermediate voltage between the reference power supply voltage VGND and the HV power supply voltage VDD2L to the gate of the PMOS output switch 11. That is, the positive polarity output SW control part 112 switches a voltage value of the high voltage output control signal GP of a negative polarity using a voltage having at least two values according to the voltage value of the positive polarity drive voltage signal VPA which is output to the output terminal DL1 to control the voltage of the high voltage output control signal GP of a negative polarity to a gate voltage with which an on-operation of the PMOS output switch 11 can be performed within an element withstand voltage lower than the output voltage range (VDD2L to VDD2H). Similarly, the negative polarity output SW control part 122 switches a voltage value of the high voltage output control signal GN of a positive polarity using a voltage having at least two values according to the voltage value of the negative polarity drive voltage signal VNA which is output to the output terminal DL1 to control the voltage of the high voltage output control signal GN of a positive polarity to a gate voltage with which an on-operation of the NMOS output switch 21 can be performed within an element withstand voltage lower than the output voltage range.

A constituent element of the drive circuit 200_1 is not limited to that shown in FIG. 4.

In short, as long as the drive circuit has a signal level conversion part that includes the following first and second output parts, a first conductivity type transistor switch, a second conductivity type transistor switch, first and second control parts, and first to fourth signal level conversion circuits, any one can be used as the drive circuit 200_1.

That is, a first output part (111) receives a high voltage input signal (VP) of a first polarity (a positive polarity) and outputs the drive voltage signal (VPA) of a first polarity obtained by amplifying the high voltage input signal of a first polarity to a first node (Ns11) according to a first high voltage control signal (SA4H, XSA4H) of a first polarity. A first conductivity type transistor switch (11) causes a voltage of the first node to be supplied to the output terminal (DL1) when the first conductivity type transistor switch (11) is in an on state and cuts off a connection between the first node and the output terminal (DL1) when the first conductivity type transistor switch (11) is in an off state. A first control part (112) causes a high voltage output control signal (GP) of a second polarity for performing on-and-off control on the first conductivity type transistor switch to be supplied to a control end (a gate) of the first conductivity type transistor switch according to a first high voltage control signal (SB4L, XSB4L) of a second polarity. A second output part (121) receives a high voltage input signal (VN) of a second polarity and outputs the second polarity drive voltage signal (VNA) obtained by amplifying the high voltage input signal of a second polarity to a second node (Ns21) according to a second high voltage control signal (SC4L, XSC4L) of a second polarity. A second conductivity type transistor switch (21) causes a voltage of the second node to be supplied to the output terminal (DL1) when the second conductivity type transistor switch (21) is in an on state and cuts off a connection between the second node and the output terminal when the second conductivity type transistor switch (21) is in an off state. A second control part (122) that causes a high voltage output control signal (GN) of a first polarity for performing on-and-off control on the second conductivity type transistor switch (21) to be supplied to a control end (a gate) of the second conductivity type transistor switch according to a second high voltage control signal (SD4H, XSD4H) of a first polarity.

A first signal level conversion circuit (100A) supplies a signal generated by once converting an amplitude of a first control signal (SA1, XSA1) of the low voltage control signal group (SA1, SB1, SC1, and SD1 and their respective complementary signals) into an amplitude between a first power supply voltage (VDD1H) of a first polarity (a positive polarity) and a second power supply voltage (VDD1L) of a second polarity (a negative polarity) and then by converting the once converted amplitude of the first control signal (SA1, XSA1) into an amplitude between a third power supply voltage (VDD2H) of a first polarity of which a voltage difference from the reference power supply voltage (VGND) is larger than that of the first power supply voltage and the reference power supply voltage to the first output part (111) as the first high voltage control signal (SA4H, XSA4H) of a first polarity. A second signal level conversion circuit (100B) supplies a signal generated by once converting an amplitude of a second control signal (SB1, XSB1) of the low voltage control signal group into an amplitude between the first power supply voltage of a first polarity and the second power supply voltage of a second polarity and then by converting the once converted amplitude of the second control signal (SB1, XSB1) into an amplitude between a fourth power supply voltage (VDD2L) of a second polarity of which a voltage difference from the reference power supply voltage is larger than that of the second power supply voltage and the reference power supply voltage to the first control part (112) as the first high voltage control signal (SB4L, XSB4L) of a second polarity. A third signal level conversion circuit (100C) supplies a signal generated by once converting an amplitude of a third control signal (SC1, XSC1) of the low voltage control signal group into an amplitude between the first power supply voltage of a first polarity and the second power supply voltage of a second polarity and then by converting the once converted amplitude of the third control signal (SC1, XSC1) into an amplitude between the fourth power supply voltage of a second polarity and the reference power supply voltage to the second output part (121) as the second high voltage control signal (SC4L, XSC4L) of a second polarity. A fourth signal level conversion circuit (100D) supplies a signal generated by once converting an amplitude of a fourth control signal (SD1, XSD1) of the low voltage control signal group into an amplitude between the first power supply voltage of a first polarity and the second power supply voltage of a second polarity and then by converting the once converted amplitude of the fourth control signal (SD1, XSD1) into an amplitude between the third power supply voltage of a first polarity and the reference power supply voltage to the second control part as the second high voltage control signal (SD4H, XSD4H) of a first polarity.

Example 4

Figure 5:
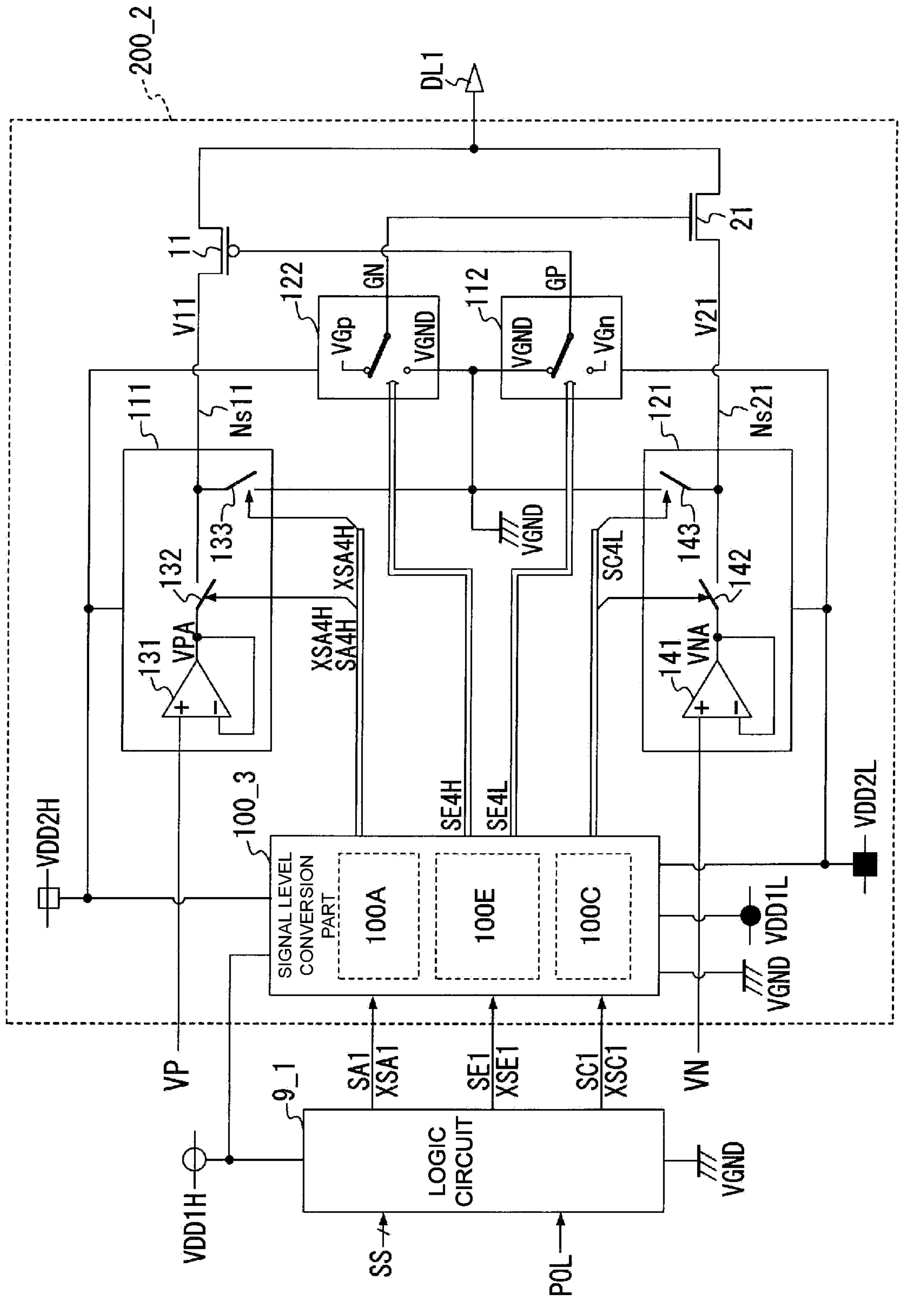
FIG. 5 is a block diagram showing a configuration of a drive circuit 200_2 as a fourth example according to the disclosure.

FIG. 5 is a block diagram showing a configuration of a drive circuit 200_2 as a fourth example according to the disclosure. In the drive circuit 200_2 shown in FIG. 5, a configuration example of internal circuits of the positive polarity signal output part 111, the negative polarity signal output part 121, the positive polarity output SW control part 112, and the negative polarity output SW control part 122 of the drive circuit 200_1 shown in FIG. 4 is shown. Further, in FIG. 5, the LV voltage signals SB1 and SD1 of FIG. 4 are replaced with a common LV voltage signal SE1, and the signal level conversion part 100_3 of FIG. 5 includes a signal level conversion circuit 100E that receives the LV voltage signals SE1 and XSE1 and converts them into HV voltage signals SE4H and XSE4H of a positive polarity and HV voltage signals SE4L and XSE4L of a negative polarity instead of the signal level conversion circuits 100B and 100D of FIG. 4. The configuration of FIG. 1 can be applied to the signal level conversion circuit 100E, for example. The signal level conversion circuits 100A and 100C, the PMOS output switch 11, and the NMOS output switch 21 are the same as those in FIG. 4.

As shown in FIG. 5, the positive polarity signal output part 111 includes an amplifier 131 and switches 132 and 133. The amplifier 131 is a voltage follower operational amplifier to which its own inverting input terminal and output node are connected and outputs the positive polarity drive voltage signal VPA obtained by amplifying the positive polarity high voltage input signal VP received at its own non-inverting input terminal from the output node. The switch 132 is constituted by, for example, a CMOS switch and is set to an on state or an off state according to the HV voltage signals SA4H and XSA4H supplied from the signal level conversion circuit 100A of the signal level conversion part 100_3. The switch 132 connects the output node of the amplifier 131 to the source of the PMOS output switch 11 via the node Ns11 in a case in which it is set to the on state, while cuts off the connection between the output node of the amplifier 131 and the source of the PMOS output switch 11 in a case in which it is set to the off state. The switch 133 is constituted by, for example, an NMOS switch and is set to an on state or an off state according to the HV voltage signal XSA4H supplied from the signal level conversion circuit 100A described above. In a case in which the switch 133 is set to the on state, the reference power supply voltage VGND is applied to the source of the PMOS output switch 11. The positive polarity output SW control part 112 includes a changeover switch (hereinafter referred to as a changeover switch 112) for generating the high voltage output control signal GP of a negative polarity by switching to the reference power supply voltage VGND or a control voltage VGn of a negative polarity. The changeover switch 112 is constituted by, for example, an inverter, switches to the reference power supply voltage VGND or the control voltage VGn of a negative polarity according to the HV voltage signal SE4L (XSE4L) supplied from the signal level conversion circuit 100E of the signal level conversion part 100_3, and supplies the high voltage output control signal GP of a negative polarity generated by the switching to the gate of the PMOS output switch 11. The control voltage VGn of a negative polarity may be a control voltage obtained by supplying a plurality of voltage values including a VGND capable of performing an on-and-off control on the PMOS output switch 11 within a predetermined element withstand voltage according to the positive polarity drive voltage signal VPA.

The negative polarity signal output part 121 shown in FIG. 5 includes an amplifier 141 and switches 142 and 143. The amplifier 141 is a voltage follower operational amplifier to which its own inverting input terminal and output node are connected and outputs the negative polarity drive voltage signal VNA obtained by amplifying the negative polarity high voltage input signal VN received at its own non-inverting input terminal from the output node. The switch 142 is set to an on state or an off state according to the HV voltage signals SC4L and XSC4L supplied from the signal level conversion circuit 100C of the signal level conversion part 100_3. The switch 142 is constituted by, for example, a CMOS switch and connects the output node of the amplifier 141 to the source of the NMOS output switch 21 via the node Ns21 in a case in which it is set to the on state, while cuts off the connection between the output node of the amplifier 141 and the source of the NMOS output switch 21 in a case in which it is set to the off state. The switch 143 is constituted by, for example, a PMOS switch and is set to an on state or an off state according to the HV voltage signal XS4L supplied from the signal level conversion circuit 100C described above. In a case in which the switch 143 is set to the on state, the reference power supply voltage VGND is applied to the source of the NMOS output switch 21.

The negative polarity output SW control part 122 includes a changeover switch (hereinafter referred to as a changeover switch 122) for generating the high voltage output control signal GN of a positive polarity by switching to the reference power supply voltage VGND or a control voltage VGp of a positive polarity. The changeover switch 122 is constituted by, for example, an inverter, switches to the reference power supply voltage VGND or the control voltage VGp of a positive polarity according to the HV voltage signal SE4H (XSE4H) supplied from the signal level conversion circuit 100E of the signal level conversion part 100_3, and supplies the high voltage output control signal GN of a positive polarity generated by the switching to the gate of the NMOS output switch 21. The control voltage VGp of a positive polarity may be a control voltage obtained by supplying a plurality of voltage values including a VGND capable of performing an on-and-off control on the NMOS output switch 21 within a predetermined element withstand voltage according to the negative polarity drive voltage signal VNA.

In the positive polarity signal output part 111 shown in FIG. 5, the switch 132 may be provided inside the amplifier 131. Further, in the negative polarity signal output part 112, the switch 142 may be provided inside the amplifier 141.

Example 5

Figure 6:
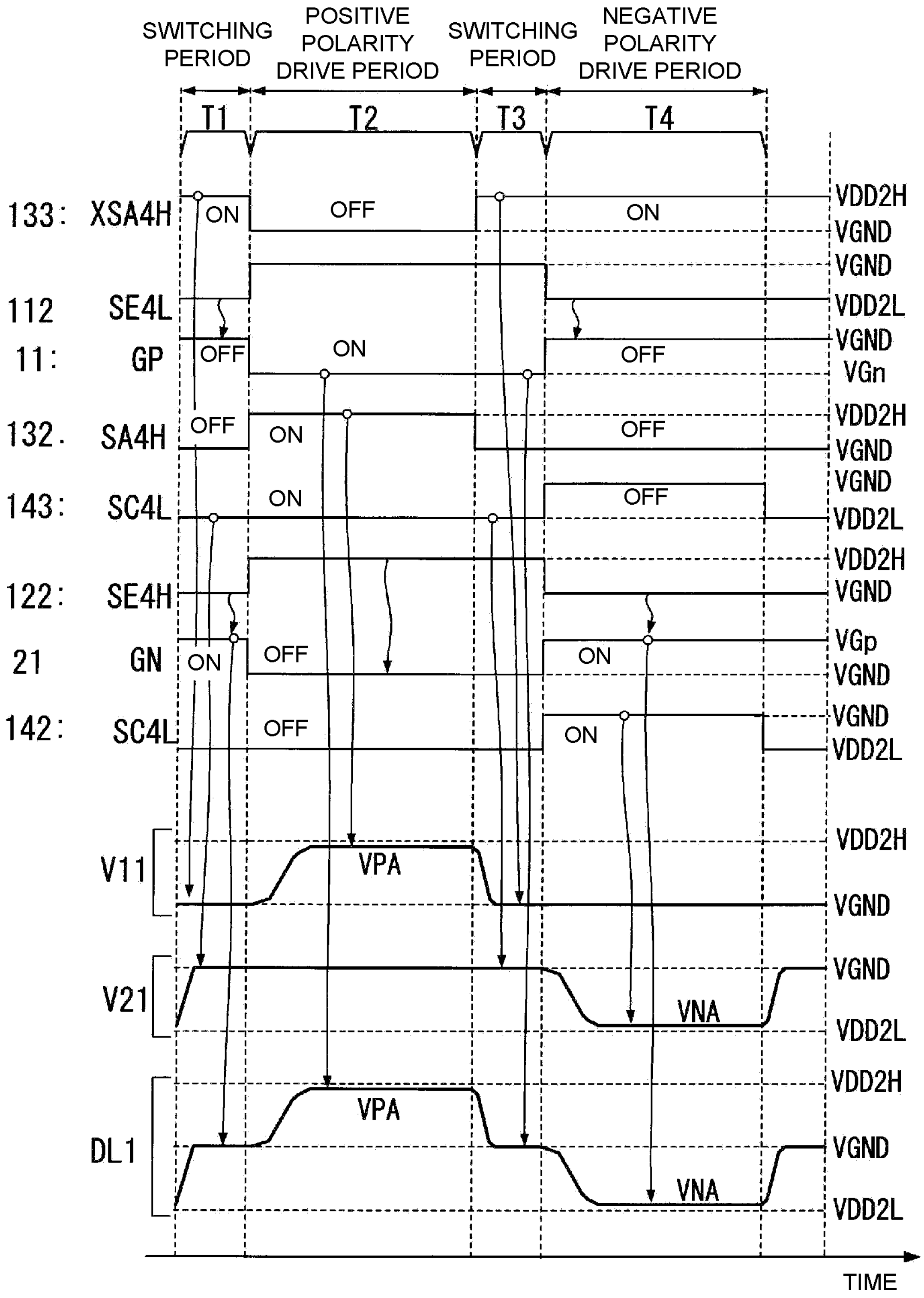
FIG. 6 is a time chart showing a control operation as a fifth example according to the disclosure in the drive circuit 200_1 or 200_2.

FIG. 6 is a time chart showing a control operation as a fifth example according to the disclosure in the drive circuit 200_1 or 200_2.

In FIG. 6, an example of each signal (SA4H, XSA4H, SC4L, XSC4L, SE4H, SE4L, GP, GN) which is generated by the signal level conversion part 100_3, the positive polarity output SW control part 112, and the negative polarity output SW control part 122 in a case in which the drive circuit 200_2 shown in FIG. 5 alternately outputs the positive polarity drive voltage signal VPA and the negative polarity drive voltage signal VNA during a predetermined positive polarity drive period and a negative polarity drive period (polarity inversion drive) is shown. The control signal of the CMOS switch shows only the control signal which is supplied to the gate of the NMOS switch.

Further, in FIG. 6, a change of each of a voltage V11 of the node Ns11 to which the source of the PMOS output switch 11 shown in FIG. 5 is connected, a voltage V21 of the node Ns21 to which the source of the NMOS output switch 21 shown in FIG. 5 is connected, and a voltage of the output terminal DL1 shown in FIG. 5 is represented. The positive polarity drive voltage signal VPA and the negative polarity drive voltage signal VNA may be an analog signal such as a step signal or sine wave having a single or a plurality of voltage levels within a voltage range corresponding to each polarity.

As shown in FIG. 6, a drive period is divided into at least four periods T1 to T4, and switching periods T1 and T3 are provided between a positive polarity drive period T2 and a negative polarity drive period T4. FIG. 6 shows a time chart from a switching period (T1) after a previous negative polarity drive period (not shown).

In FIG. 6, first, in the switching period T1, both the switches 132 and 142 become an off state according to the HV voltage signals SA4H and SC4L, and the supply of the drive voltage signal from the positive polarity signal output part 111 and the negative polarity signal output part 121 is shut off. Further, the switch 133 becomes an on state according to the HV voltage signal XSA4H having the power supply voltage VDD2H, and the voltage V11 of the node Ns11 becomes the reference power supply voltage VGND. Further, since the HV voltage signal SC4L having the power supply voltage VDD2L of a second polarity (a negative polarity) is supplied to the switch 143, the switch 143 becomes an on state, and as shown in FIG. 6, the voltage V21 of the node Ns21 is raised to the reference power supply voltage VGND from the negative polarity drive voltage signal VNA during the immediately previous negative polarity drive period. Further, the changeover switch 112 switches the high voltage output control signal GP of a negative polarity to the reference power supply voltage VGND according to the HV voltage signal SE4L having the power supply voltage VDD2L. As a result, the high voltage output control signal GP of a negative polarity having the reference power supply voltage VGND is supplied to the gate of the PMOS output switch 11, and the PMOS output switch 11 becomes an off state. Further, the changeover switch 122 switches the high voltage output control signal GN of a positive polarity to the control voltage VGp of a positive polarity according to the HV voltage signal SE4H having the reference power supply voltage VGND. As a result, the high voltage output control signal GN of a positive polarity having the control voltage VGp is supplied to the gate of the NMOS output switch 21, and the NMOS output switch 21 becomes an on state.

Therefore, in the period T1, the reference power supply voltage VGND as the voltage V21 of the node Ns21 is applied to the output terminal DL1 via the NMOS output switch 21.

At this time, as shown in FIG. 6, the voltage of the output terminal DL1 which was in the state of the negative polarity drive voltage signal VNA is raised to the reference power supply voltage VGND via the NMOS output switch 21.

Throughout the period T1, each terminal of the switch 133 and the changeover switch 122 is controlled between the reference power supply voltage VGND and the power supply voltage VDD2H of a first polarity (a positive polarity). Each terminal of the PMOS output switch 11, the switch 143, and the changeover switch 112 is controlled between the reference power supply voltage VGND and the power supply voltage VDD2L of a second polarity (a negative polarity). The drain and the source of the NMOS output switch 21 are controlled between the reference power supply voltage VGND and the power supply voltage VDD2L of a second polarity (a negative polarity). The control voltage VGp within a predetermined voltage difference (withstand voltage) at which the NMOS output switch 21 becomes an on state with respect to the drain and the source in a state of the negative polarity drive voltage signal VNA is supplied to the gate of the NMOS output switch 21, and the voltage difference between the terminals of the NMOS output switch 21 is reduced due to the reference power supply voltage VGND which is supplied to the node Ns21. Therefore, the PMOS output switch 11, the NMOS output switch 21, the switch 133, the switch 143, the changeover switch 112, and the changeover switch 122 are controlled within a predetermined element withstand voltage range lower than the output voltage range (VDD2L to VDD2H) of the output terminal DL1.

Next, in the period T2, the HV voltage signal XSA4H having the reference power supply voltage VGND is supplied to the switch 133, and thus the switch 133 becomes an off state. Further, since the HV voltage signal SC4L having the power supply voltage VDD2L is continuously supplied to the switch 143, the switch 143 is maintained in on state, and the voltage V21 of the node Ns21 becomes the reference power supply voltage VGND. Further, only the switch 132 of the switches 132 and 142 is switched to an on state according to the HV voltage signals SA4H and SC4L. As a result, the positive polarity drive voltage signal VPA generated by the positive polarity signal output part 111 is supplied to the node Ns11. Further, the changeover switch 112 switches the high voltage output control signal GP of a negative polarity to the control voltage VGn of a negative polarity according to the HV voltage signal SE4L having the reference power supply voltage VGND. As a result, the PMOS output switch 11 becomes an on state. Further, the changeover switch 122 switches the high voltage output control signal GN of a positive polarity to the reference power supply voltage VGND according to the HV voltage signal SE4H having the power supply voltage VDD2H. As a result, the NMOS output switch 21 is switched to an off state.

Therefore, in the period T2, the positive polarity drive voltage signal VPA output from the positive polarity signal output part 111 is output to the output terminal DL1 via the node Ns11 and the PMOS output switch 11.

At this time, the NMOS output switch 21 is in an off state, and the electrical connection between the node Ns21 and the output terminal DL1 is cut off. Therefore, as shown in FIG. 6, the voltage V11 of the node Ns11 and the voltage of the output terminal DL1 are raised from a state of the reference power supply voltage VGND to the positive polarity drive voltage signal VPA. On the other hand, the voltage V21 of the node Ns21 is maintained in a state of the reference power supply voltage VGND as shown in FIG. 6.

Throughout the period T2, each terminal of the switch 133, the changeover switch 122, and NMOS output switch 21 is controlled between the reference power supply voltage VGND and the power supply voltage VDD2H of a first polarity (a positive polarity). Each terminal of the switch 143 and the changeover switch 112 is controlled between the reference power supply voltage VGND and the power supply voltage VDD2L of a second polarity (a negative polarity). The drain and the source among terminals of the PMOS output switch 11 are controlled with the positive polarity drive voltage signal VPA between the reference power supply voltage VGND and the power supply voltage VDD2H. The control voltage VGn of a negative polarity within a predetermined voltage difference (withstand voltage) at which the PMOS output switch 11 becomes an on state with respect to the positive polarity drive voltage signal VPA is applied to the gate of the PMOS output switch 11. Therefore, the PMOS output switch 11, the NMOS output switch 21, the switch 133, the switch 143, the changeover switch 112, and the changeover switch 122 are controlled within a predetermined element withstand voltage range lower than the output voltage range (VDD2L to VDD2H) of the output terminal DL1.

Next, in the period T3, both the switches 132 and 142 become an off state according to the HV voltage signals S4H and S4L, and the supply of the drive voltage signal from the positive polarity signal output part 111 and the negative polarity signal output part 121 is shut off. Further, since the HV voltage signal XS4H having the power supply voltage VDD2H is supplied to the switch 133, the switch 133 becomes an on state, and as shown in FIG. 6, the voltage V11 of the node Ns11 is lowered to the reference power supply voltage VGND from the positive polarity drive voltage signal VPA. Further, since the HV voltage signal XS4L having the power supply voltage VDD2L is continuously supplied to the switch 143, the switch 143 is maintained in on state, and the voltage V21 of the node Ns21 continuously becomes the reference power supply voltage VGND. Further, since the high voltage output control signal GP of a negative polarity having the control voltage VGn is continuously supplied to the gate of the PMOS output switch 11, the PMOS output switch 11 is maintained in an on state as shown FIG. 6. Further, the high voltage output control signal GN of a positive polarity is maintained at the reference power supply voltage VGND according to the HV voltage signal SE4H. As a result, the NMOS output switch 21 is maintained in an off state as shown in FIG. 6.

Therefore, in the period T3, as shown FIG. 6, the reference power supply voltage VGND as the voltage V11 of the node Ns11 is output to the output terminal DL1 via the PMOS output switch 11.

At this time, as shown in FIG. 6, the voltage of the output terminal DL1 which was the positive polarity drive voltage signal VPA is lowered to the reference power supply voltage VGND via the PMOS output switch 11.

Although the switch 133 changed from an off state to an on state throughout the period T3, the control voltage range of each switch did not change. Therefore, similarly to the period T2, the PMOS output switch 11, the NMOS output switch 21, the switch 133, the switch 143, the changeover switch 112, and the changeover switch 122 are controlled within a predetermined element withstand voltage range lower than the output voltage range (VDD2L to VDD2H) of the output terminal DLL Next, in the period T4, since the HV voltage signal XSA4H having the power supply voltage VDD2H of a first polarity (a positive polarity) is continuously supplied to the switch 133, the switch 133 becomes an on state, and the voltage V11 of the node Ns11 continuously becomes the reference power supply voltage VGND. Further, the HV voltage signal SC4L having the reference power supply voltage VGND is supplied to the switch 143, and thus the switch 143 becomes an off state. Further, only the switch 142 of the switches 132 and 142 is switched to an on state according to the HV voltage signals SA4H and SC4L. As a result, the negative polarity drive voltage signal VNA output from the negative polarity signal output part 121 is supplied to the node Ns21. Further, the changeover switch 112 switches the high voltage output control signal GP of a negative polarity to the reference power supply voltage VGND according to the HV voltage signal SE4L having the power supply voltage VDD2L. As a result, the PMOS output switch 11 becomes an off state. Further, the changeover switch 122 switches the high voltage output control signal GN of a positive polarity to the control voltage VGp of a positive polarity according to the HV voltage signal SE4H having the reference power supply voltage VGND. As a result, the NMOS output switch 21 is switched to an on state.

Therefore, in the period T4, the negative polarity drive voltage signal VNA output from the negative polarity signal output part 121 is output to the output terminal DL1 via the node Ns21 and the PMOS output switch 11.

At this time, as shown FIG. 6, the PMOS output switch 11 is in an off state, and the electrical connection between the node Ns11 and the output terminal DL1 is cut off. Therefore, as shown in FIG. 6, the voltage V21 of the node Ns21 and the voltage of the output terminal DL1 are lowered from a state of the reference power supply voltage VGND to the negative polarity drive voltage signal VNA. On the other hand, the voltage V11 of the node Ns11 is maintained in a state of the reference power supply voltage VGND as shown in FIG. 6.

Throughout the period T4, each terminal of the switch 143, the changeover switch 112, and PMOS output switch 11 is controlled between the reference power supply voltage VGND and the power supply voltage VDD2L of a second polarity (a negative polarity). Each terminal of the switch 133 and the changeover switch 122 is controlled between the reference power supply voltage VGND and the power supply voltage VDD2H of a first polarity (a positive polarity). The drain and the source among terminals of the NMOS output switch 21 are controlled with the negative polarity drive voltage signal VNA between the reference power supply voltage VGND and the power supply voltage VDD2L. The control voltage VGp of a positive polarity within a predetermined voltage difference (withstand voltage) at which the NMOS output switch 21 becomes an on state with respect to the negative polarity drive voltage signal VNA is applied to the gate of the NMOS output switch 21. Therefore, the PMOS output switch 11, the NMOS output switch 21, the switch 133, the switch 143, the changeover switch 112, and the changeover switch 122 are controlled within a predetermined element withstand voltage range lower than the output voltage range (VDD2L to VDD2H) of the output terminal DL1.

In the drive control of FIG. 6, the drive circuit 200_2 of FIG. 5 switches the drive voltage signal VPA of a positive polarity or the drive voltage signal VNA of a negative polarity at a predetermined period and outputs it to the output terminal DLL Therefore, for example, in the drive circuit provided with a plurality of drive circuits 200_2 of FIG. 5, some of the circuit may be shared between the drive circuits 200_2 that output drive voltage signals having different polarities at the same timing. Specifically, the amplifier 131 of the positive polarity signal output part 111 and the amplifier 141 of the negative polarity signal output part 121 can be shared between two drive circuits 200_2 that output drive voltage signals having different polarities at the same timing.

Example 6

Figure 7:
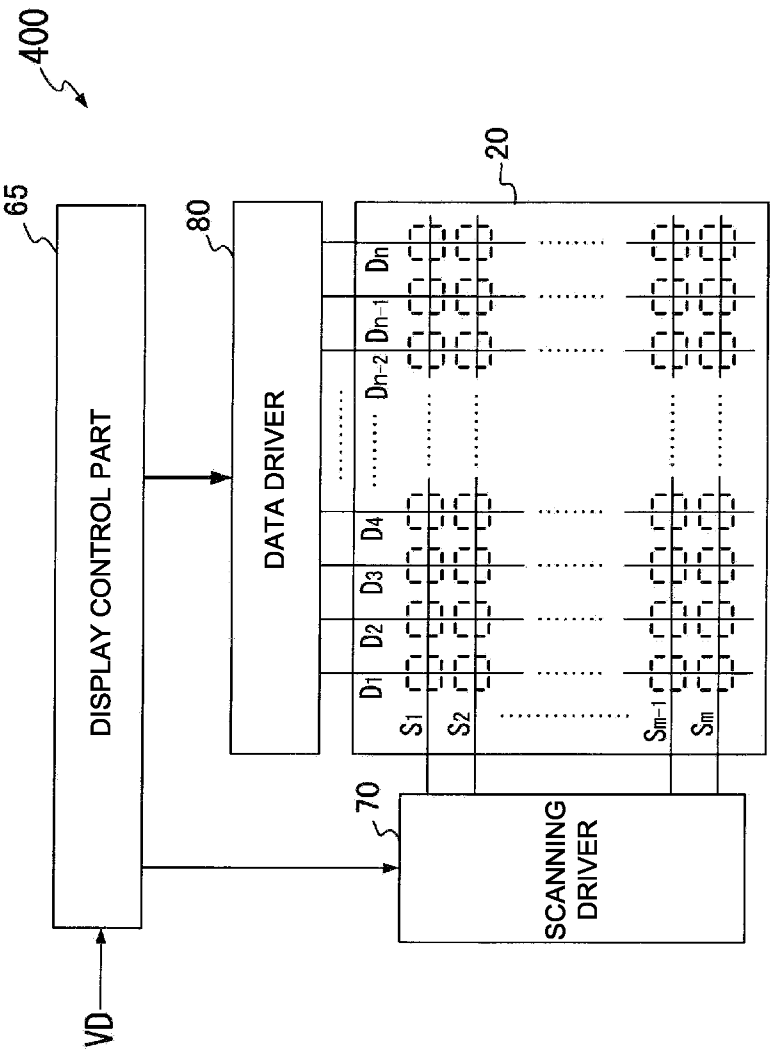
FIG. 7 is a block diagram showing a configuration of a liquid crystal display device 400 as a sixth example according to the disclosure which includes a data driver including a signal level conversion circuit and a drive circuit according to the disclosure.

FIG. 7 is a block diagram showing a configuration of a liquid crystal display device 400 as a sixth example according to the disclosure which includes a data driver including a signal level conversion part and a drive circuit according to the disclosure.

In FIG. 7, The display panel 20 is an active matrix type liquid display panel and has m horizontal scanning lines S1 to Sm (m is a natural number of 2 or more) extending in a horizontal direction of a two-dimensional screen and n data lines D1 to Dn (n is a natural number of 2 or more) extending in a vertical direction of the two-dimensional screen. A display cell responsible for a pixel is formed at each intersection of the horizontal scanning lines and the data lines. The display cell includes at least a switch element and a pixel electrode, and when the switch element becomes an on state according to a scanning pulse from the horizontal scanning line, a gradation voltage signal from a data line is applied to the pixel electrode via the switch element, and a brightness of a liquid crystal display device is controlled according to the gradation voltage applied to the pixel electrode. In FIG. 7, a specific configuration of the display cell is omitted.

A display control part 65 receives a video signal VD in which a control signal and the like are integrated, generates a timing signal based on a horizontal synchronization signal from among the video signal VD, and supplies the timing signal to a scanning driver 70. Further, based on the video signal VD, the display control part 65 supplies a control signal group representing various timing signals including a polarity inversion signal POL, a start pulse, and a clock signal CLK and a video digital signal including a series of pixel data PD in which a brightness level of each pixel is indicated with, for example, an 8-bit brightness gradation to a data driver 80.

The scanning driver 70 sequentially applies horizontal scanning pulses to each of the horizontal scanning lines S1 to Sm of the display panel 20 at a timing indicated by the control signal supplied from the display control part 65.

The data driver 80 is formed with a semiconductor device such as a large scale integrated circuit (LSI). The data driver 80 converts the pixel data PD included in the video digital signal supplied from the display control part 65 into drive voltage signals G1 to Gn each having the gradation voltage corresponding to each of the pixel data PD for one horizontal scanning line, that is, for each n data lines. Then, the data driver 80 applies the drive voltage signals G1 to Gn to the data lines D1 to Dn of the display panel 20. In the scanning driver 70 or the data driver 80, a part or all of a circuit thereof may be integrally formed with the display panel 20. Further, the data driver 80 may be a data driver in which the display control part 65 is built. Further, the data driver 80 may be constituted by a plurality of LSIs.

Figure 8:
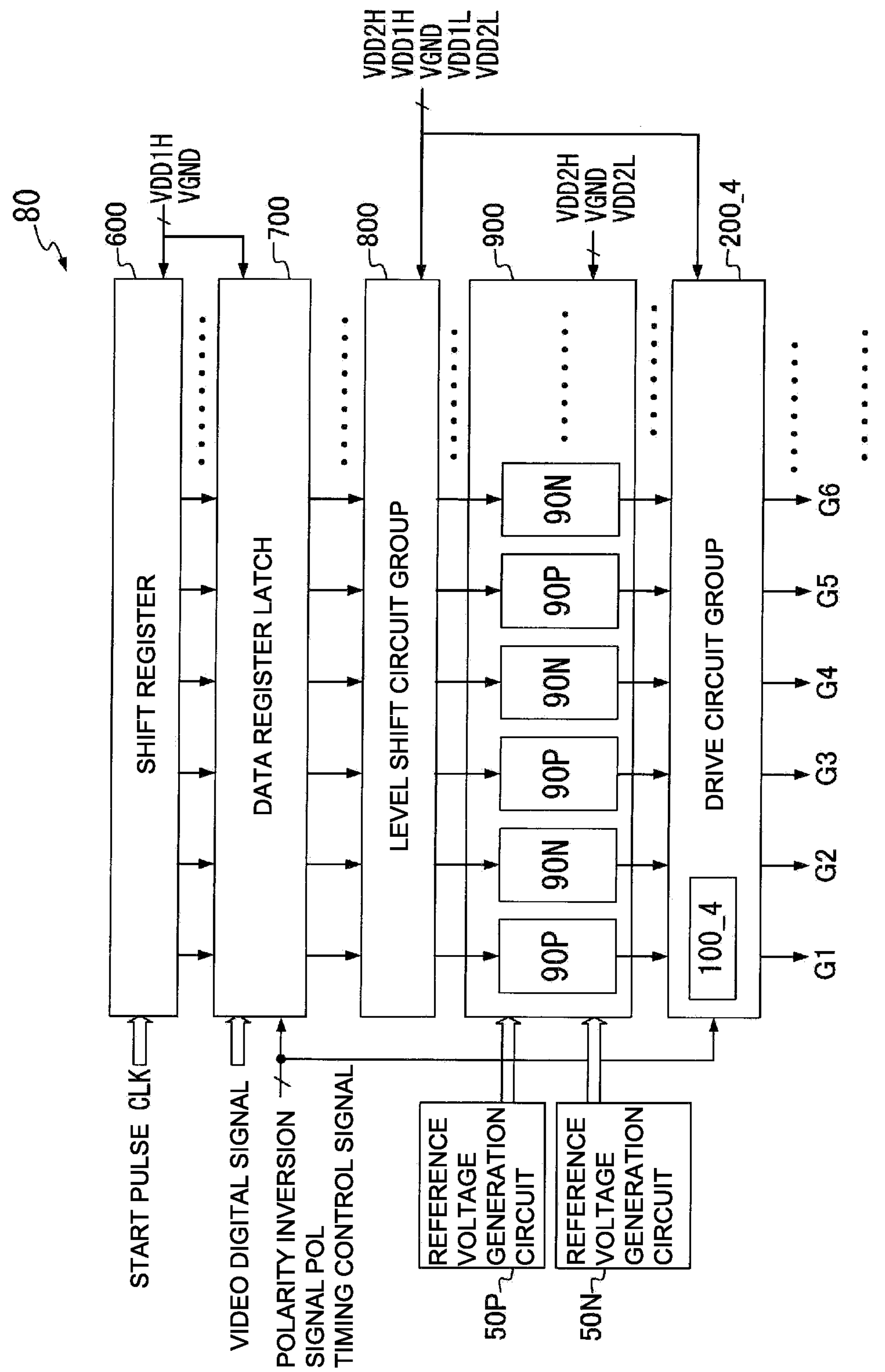
FIG. 8 is a block diagram showing a configuration of a data driver 80.

FIG. 8 is a block diagram showing an internal configuration of the data driver 80.

As shown in FIG. 8, the data driver 80 includes a positive polarity reference voltage generation circuit 50P, a negative polarity reference voltage generation circuit 50N, a shift register 600, a data register latch 700, a level shift circuit group 800, a decoder part 900, and a drive circuit group 200_4. The drive circuit group 200_4 includes a signal level conversion part 100_4. Each of the shift register 600 and the data register latch 700 is supplied with the reference power supply voltage VGND and the LV power supply voltage VDD1H of a positive polarity. The decoder part 900 is supplied with the reference power supply voltage VGND, the HV power supply voltage VDD2H of a positive polarity, and the HV power supply voltage VDD2L of a negative polarity. Each of the level shift circuit group 800 and the drive circuit group 200_4 is supplied with the reference power supply voltage VGND, the LV power supply voltage VDD1H and HV power supply voltage VDD2H of a positive polarity, and the LV power supply voltage VDD1L and HV power supply voltage VDD2L of a negative polarity.

The shift register 600 generates a plurality of latch timing signals for selecting the latch in synchronization with the clock signal CLK according to the start pulse and supplies the latch timing signals to the data register latch 700.

The data register latch 700 receives the video digital signal and the LV control signal group for controlling various timings such as the polarity inversion signal POL. Based on each of the latch timing signals supplied from the shift register 600, the data register latch 700 captures a plurality of pieces of pixel data included in the video digital signal and supplies each of them to the level shift circuit group 800 at the latch timing. The data register latch 700 alternately supplies each of the captured pieces of pixel data to the level shift circuit for a positive polarity and the level shift circuit for a negative polarity included in the level shift circuit group 800 according to the polarity inversion signal POL.

The level shift circuit group 800 converts a signal level of each piece of pixel data based on the LV power supply voltage (VDD1H, VGND) for a logic circuit into a positive polarity HV digital signal (VGND/VDD2H) and a negative polarity HV digital signal (VDD2L/VGND) and supplies them to a plurality of positive polarity decoders 90P and a plurality of negative polarity decoders 90N included in the decoder part 900. The level shift circuit group 800 may include any one of a plurality of the signal level conversion circuits 100, 100_H, 100_L, 100_1 shown in FIG. 1 (FIG. 3), FIG. 2A, and FIG. 2B, or a combination thereof.

The decoder part 900 is configured by assigning a pair of the positive polarity decoder 90P and the negative polarity decoder 90N for each two output terminals of the data driver 80, for example. The order of the positive polarity decoder 90P and the negative polarity decoder 90N can be changed in the decoder part 900. For example, to suppress a layout area, the decoders having the same polarity may be disposed together for a plurality of outputs.

The positive polarity reference voltage generation circuit 50P and the negative polarity reference voltage generation circuit 50N generate a plurality of reference voltages having different voltage values and supply them to the positive polarity decoder 90P and the negative polarity decoder 90N provided for each of the plurality of output terminals of the data driver 80.

The positive polarity decoder 90P and the negative polarity decoder 90N select the reference voltage of a positive polarity and the reference voltage of a negative polarity corresponding to the positive polarity HV digital signal and the negative polarity HV digital signal from the above-mentioned plurality of reference voltages, respectively, and supplies them to the drive circuit group 200_4 as a gradation voltage of a positive polarity and a gradation voltage of a negative polarity.

The drive circuit group 200_4 receives the polarity inversion signal POL and the LV control signal group indicating various timings and generates the HV voltage signal group for controlling the timing of each drive circuit of the drive circuit group 200_4 in the signal level conversion part 100_4. The signal level conversion part 100_4 includes any one of a plurality of the signal level conversion circuits 100, 100_H, 100_L, and 100_1 shown in FIG. 1 (FIG. 3), FIG. 2A, and FIG. 2B, or a combination thereof according to a system of the LV control signal group. Each drive circuit of the drive circuit group 200_4 receives the gradation voltage of a positive polarity and the gradation voltage of a negative polarity supplied from the decoder part 900 as the positive polarity high voltage input signal (VP) and the negative polarity high voltage input signal (VN) and outputs the amplified positive polarity drive voltage signal (VPA) and negative polarity drive voltage signal (VNA) from each output terminal of the data driver 80. At this time, the drive circuit group 200_4 receives the polarity inversion signal POL and the timing control signal in a pair of the drive circuits that output the drive voltage signals having different polarities (for example, a pair of the drive circuits that drive two adjacent output terminals) as the LV control signal group and switches the polarity of the drive voltage signal which is output from each output terminal of the pair of drive circuits at the drive timing corresponding to the LV control signal group.

For example, at the drive timing corresponding to the polarity inversion signal POL and the timing control signal, a state in which the positive polarity drive voltage signal is output from one output terminal of the pair of drive circuits and the negative polarity drive voltage signal is output from the other output terminal is switched to a state in which the negative polarity drive voltage signal is output from one output terminal and the positive polarity drive voltage signal is output from the other output terminal.

Each of the level shift circuit group 800, the decoder part 900, and the drive circuit group 200_4 can be constituted by transistors each having the element withstand voltage lower than the drive voltage range (VDD2L to VDD2H) of a positive polarity and a negative polarity (for example, about ½ of the voltage difference |VDD2H−VDD2L|). As a result, a driver area can be reduced and the cost can be reduced.

In the signal level conversion circuit according to the disclosure, first, the first level shift part level-shifts the amplitude of the input signal of a low voltage to the polarity side opposite to the polarity of the input signal to obtain the voltage signal that oscillates in a range from the low voltage of a positive polarity to the low voltage of a negative polarity. Next, the second level shift part converts the voltage signal that oscillates in the range from the low voltage of a positive polarity to the low voltage of a negative polarity into the low voltage signal of a positive polarity, and the third level shift part level-shifts the amplitude of the low voltage signal of a positive polarity to the high voltage signal of a positive polarity. Further, the fourth level shift part converts the voltage signal that oscillates in the range from the low voltage of a positive polarity to the low voltage of a negative polarity into the low voltage signal of a negative polarity, and the fifth level shift part level-shifts the amplitude of the low voltage signal of a negative polarity to the high voltage signal of a negative polarity.

According to such a configuration, it is possible to match a processing time in the signal level conversion part for a positive polarity which is constituted by the first, second and third level shift parts with a processing time in the signal level conversion part for a negative polarity which is constituted by the first, fourth and fifth level shift parts.

Further, in each of the first to fifth level shift parts, a switch element (a transistor) having a withstand voltage lower than the output voltage range from the high voltage signal of a negative polarity to the high voltage signal of a positive polarity can be used.

Therefore, according to the signal level conversion circuit of the disclosure, it is possible to convert an input voltage signal of a low voltage into a high voltage signal of a first polarity and a high voltage signal of a second polarity and to output them at a synchronized timing using a switch element having an element withstand voltage lower than the output voltage range. Further, even in a case in which a plurality of input voltage signals of a low voltage is converted into a high voltage signal of a first polarity and a high voltage signal of a second polarity by the signal level conversion circuit according to the disclosure, it is possible to convert the plurality of input voltage signals into the high voltage signal of a first polarity and the high voltage signal of a second polarity while maintaining the timing between the plurality of input voltage signals of a low voltage.

Further, by employing the above-mentioned signal level conversion circuit for the drive circuit that alternately outputs the drive voltage signal of a positive polarity having a high voltage and the drive voltage signal of a negative polarity from one output terminal according to the low voltage control signal and by converting the low voltage control signal group into the high voltage control signal groups of a positive polarity and a negative polarity for drive timing control, it is possible to realize an area-saving drive circuit constituted by transistors each having an element withstand voltage lower than the output voltage range. Further, it is possible to perform coping with a high drive frequency for which highly accurate drive timing control is required.

What is claimed is:

1. A signal level conversion circuit that level-shifts an amplitude of an input voltage signal, comprising:

a first level shift circuit that generates a voltage signal obtained by converting the amplitude of the input voltage signal into an amplitude between a first power supply voltage having a first polarity with respect to a predetermined reference power supply voltage and a second power supply voltage of a second polarity having a polarity opposite to the first polarity with respect to the reference power supply voltage;

a second level shift circuit that generates a voltage signal obtained by converting the amplitude of the voltage signal into an amplitude between the reference power supply voltage and the first power supply voltage as a first polarity voltage signal;

a third level shift circuit that outputs a voltage signal obtained by converting the amplitude of the first polarity voltage signal into an amplitude between a third power supply voltage of the first polarity of which a voltage difference from the reference power supply voltage is larger than that of the first power supply voltage and the reference power supply voltage as a high voltage signal of the first polarity;

a fourth level shift circuit that generates a voltage signal obtained by converting the amplitude of the voltage signal generated by the first level shift circuit into an amplitude between the reference power supply voltage and the second power supply voltage as a second polarity voltage signal; and a fifth level shift circuit that outputs a voltage signal obtained by converting the amplitude of the second polarity voltage signal into an amplitude between a fourth power supply voltage of the second polarity of which a voltage difference from the reference power supply voltage is larger than that of the second power supply voltage and the reference power supply voltage as a high voltage signal of the second polarity, wherein the signal level conversion circuit is constituted by transistors each having a withstand voltage lower than a voltage difference between the third power supply voltage of the first polarity and the fourth power supply voltage of the second polarity, wherein the third power supply voltage is greater than the first power supply voltage, the first power supply voltage is greater than the reference power supply voltage, the reference power supply voltage is greater than the second power supply voltage, and the second power supply voltage is greater than the fourth power supply voltage.

2. The signal level conversion circuit according to claim 1, wherein the first level shift circuit is supplied with the first power supply voltage of a first polarity and the second power supply voltage of a second polarity, receives one or both of the input voltage signal and a complementary signal of the input voltage signal, and generates first and second voltage signals obtained by converting the input voltage signal or the complementary signal of the input voltage signal into an amplitude between the first power supply voltage and the second power supply voltage, wherein the second level shift circuit is supplied with the first power supply voltage and the reference power supply voltage, receives one of the first and second voltage signals, and generates a signal obtained by converting the one voltage signal into an amplitude between the first power supply voltage and the reference power supply voltage as the first polarity voltage signal, and wherein the third level shift circuit is supplied with the third power supply voltage of a first polarity and the reference power supply voltage, receives one or both of the first polarity voltage signal and a complementary signal of the first polarity voltage signal, and generates at least one of two mutually complementary signals obtained by converting the first polarity voltage signal into an amplitude between the third power supply voltage and the reference power supply voltage as the high voltage signal of a first polarity.

3. The signal level conversion circuit according to claim 1, wherein the first level shift circuit is supplied with the first power supply voltage of a first polarity and the second power supply voltage of a second polarity, receives one or both of the input voltage signal and a complementary signal of the input voltage signal, and generates first and second voltage signals obtained by converting the input voltage signal or the complementary signal of the input voltage signal into an amplitude between the first power supply voltage and the second power supply voltage, wherein the second level shift circuit is supplied with the first power supply voltage and the reference power supply voltage, receives one of the first and second voltage signals, and generates a signal obtained by converting the one voltage signal into an amplitude between the first power supply voltage and the reference power supply voltage as the first polarity voltage signal, wherein the third level shift circuit is supplied with the third power supply voltage of a first polarity and the reference power supply voltage, receives one or both of the first polarity voltage signal and a complementary signal of the first polarity voltage signal, and generates at least one of two mutually complementary signals obtained by converting the first polarity voltage signal into an amplitude between the third power supply voltage and the reference power supply voltage as the high voltage signal of a first polarity, wherein the fourth level shift circuit is supplied with the second power supply voltage and the reference power supply voltage, receives another of the first and second voltage signals, and generates a signal obtained by converting the other voltage signal into an amplitude between the second power supply voltage and the reference power supply voltage as the second polarity voltage signal, and wherein the fifth level shift circuit is supplied with the fourth power supply voltage of a second polarity and the reference power supply voltage, receives one or both of the second polarity voltage signal and a complementary signal of the second polarity voltage signal, and generates at least one of two mutually complementary signals obtained by converting the second polarity voltage signal into an amplitude between the fourth power supply voltage and the reference power supply voltage as the high voltage signal of a second polarity.

4. The signal level conversion circuit according to claim 3, wherein the fourth level shift circuit is configured such that the first power supply voltage of a first polarity which is supplied to the second level shift circuit is replaced with the second power supply voltage of a second polarity and a conductivity type of a transistor constituting the second level shift circuit is different from a conductivity type of a transistor constituting the fourth level shift circuit, and wherein the fifth level shift circuit is configured such that the third power supply voltage of a first polarity which is supplied to the third level shift circuit is replaced with the fourth power supply voltage of a second polarity and a conductivity type of a transistor constituting the third level shift circuit is different from a conductivity type of a transistor constituting the fifth level shift circuit.

5. The signal level conversion circuit according to claim 1, wherein the fourth level shift circuit is configured such that the first power supply voltage of a first polarity which is supplied to the second level shift circuit is replaced with the second power supply voltage of a second polarity and a conductivity type of a transistor constituting the second level shift circuit is different from a conductivity type of a transistor constituting the fourth level shift circuit, and wherein the fifth level shift circuit is configured such that the third power supply voltage of a first polarity which is supplied to the third level shift circuit is replaced with the fourth power supply voltage of a second polarity and a conductivity type of a transistor constituting the third level shift circuit is different from a conductivity type of a transistor constituting the fifth level shift circuit.

6. A drive circuit of which a drive timing is controlled based on a low voltage control signal group and which outputs a high voltage first polarity drive voltage signal having a first polarity with respect to a predetermined reference power supply voltage from an output terminal during load drive, the drive circuit comprising:

an output circuit that receives a high voltage input signal of a first polarity and outputs the first polarity drive voltage signal obtained by amplifying the high voltage input signal of a first polarity to a first node according to a high voltage control signal of a first polarity;

a first conductivity type transistor switch which causes a voltage of the first node to be supplied to the output terminal when the first conductivity type transistor switch is in an on state and cuts off a connection between the first node and the output terminal when the first conductivity type transistor switch is in an off state;

a control circuit that causes a high voltage output control signal of a second polarity for performing on-and-off control on the first conductivity type transistor switch to be supplied to a control end of the first conductivity type transistor switch according to a high voltage control signal having a second polarity with respect to the reference power supply voltage; and a signal level conversion circuit that includes first and second signal level conversion circuits, wherein the first signal level conversion circuit supplies a signal generated by once converting an amplitude of a first control signal of the low voltage control signal group into an amplitude between a first power supply voltage of a first polarity and a second power supply voltage of a second polarity and then by converting the once converted amplitude of the first control signal into an amplitude between a third power supply voltage of a first polarity of which a voltage difference from the reference power supply voltage is larger than that of the first power supply voltage and the reference power supply voltage to the output circuit as the first high voltage control signal of a first polarity, and wherein the second signal level conversion circuit supplies a signal generated by once converting an amplitude of a second control signal of the low voltage control signal group into an amplitude between the first power supply voltage of a first polarity and the second power supply voltage of a second polarity and then by converting the once converted amplitude of the second control signal into an amplitude between a fourth power supply voltage of a second polarity of which a voltage difference from the reference power supply voltage is larger than that of the second power supply voltage and the reference power supply voltage to the control circuit as the first high voltage control signal of a second polarity.

7. The drive circuit according to claim 6, which is constituted by transistors each having a withstand voltage lower than a voltage difference between the third power supply voltage of a first polarity and the fourth power supply voltage of a second polarity.

8. A drive circuit of which a drive timing is controlled based on a low voltage control signal group and which selects one of a high voltage first polarity drive voltage signal having a first polarity and a high voltage second polarity drive voltage signal having a second polarity with respect to a predetermined reference power supply voltage and outputs the selected one signal from an output terminal during load drive, the drive circuit comprising:

a first output circuit that receives a high voltage input signal of a first polarity and outputs the first polarity drive voltage signal obtained by amplifying the high voltage input signal of a first polarity to a first node according to a first high voltage control signal of a first polarity;

a first conductivity type transistor switch which causes a voltage of the first node to be supplied to the output terminal when the first conductivity type transistor switch is in an on state and cuts off a connection between the first node and the output terminal when the first conductivity type transistor switch is in an off state;

a first control circuit that causes a high voltage output control signal of a second polarity for performing on-and-off control on the first conductivity type transistor switch to be supplied to a control end of the first conductivity type transistor switch according to a first high voltage control signal of a second polarity;

a second output circuit that receives a high voltage input signal of a second polarity and outputs the second polarity drive voltage signal obtained by amplifying the high voltage input signal of a second polarity to a second node according to a second high voltage control signal of a second polarity;

a second conductivity type transistor switch which causes a voltage of the second node to be supplied to the output terminal when the second conductivity type transistor switch is in an on state and cuts off a connection between the second node and the output terminal when the second conductivity type transistor switch is in an off state;

a second control circuit that causes a high voltage output control signal of a first polarity for performing on-and-off control on the second conductivity type transistor switch to be supplied to a control end of the second conductivity type transistor switch according to a second high voltage control signal of a first polarity; and a signal level conversion circuit that includes first to fourth signal level conversion circuits, wherein the first signal level conversion circuit supplies a signal generated by once converting an amplitude of a first control signal of the low voltage control signal group into an amplitude between a first power supply voltage of a first polarity and a second power supply voltage of a second polarity and then by converting the once converted amplitude of the first control signal into an amplitude between a third power supply voltage of a first polarity of which a voltage difference from the reference power supply voltage is larger than that of the first power supply voltage and the reference power supply voltage to the first output circuit as the first high voltage control signal of a first polarity, wherein the second signal level conversion circuit supplies a signal generated by once converting an amplitude of a second control signal of the low voltage control signal group into an amplitude between the first power supply voltage of a first polarity and the second power supply voltage of a second polarity and then by converting the once converted amplitude of the second control signal into an amplitude between a fourth power supply voltage of a second polarity of which a voltage difference from the reference power supply voltage is larger than that of the second power supply voltage and the reference power supply voltage to the first control circuit as the first high voltage control signal of a second polarity, wherein the third signal level conversion circuit supplies a signal generated by once converting an amplitude of a third control signal of the low voltage control signal group into an amplitude between the first power supply voltage of a first polarity and the second power supply voltage of a second polarity and then by converting the once converted amplitude of the third control signal into an amplitude between the fourth power supply voltage of a second polarity and the reference power supply voltage to the second output circuit as the second high voltage control signal of a second polarity, and wherein the fourth signal level conversion circuit supplies a signal generated by once converting an amplitude of a fourth control signal of the low voltage control signal group into an amplitude between the first power supply voltage of a first polarity and the second power supply voltage of a second polarity and then by converting the once converted amplitude of the fourth control signal into an amplitude between the third power supply voltage of a first polarity and the reference power supply voltage to the second control circuit as the second high voltage control signal of a first polarity.

9. The drive circuit according to claim 8, wherein the fourth control signal is shared with the second control signal, wherein a fifth signal level conversion circuit is provided instead of the second and fourth signal level conversion circuits, and wherein the fifth signal level conversion circuit once converts the amplitude of the second control signal of the low voltage control signal group into an amplitude between the first power supply voltage of a first polarity and the second power supply voltage of a second polarity to generate first and second control signals, outputs a signal generated by converting an amplitude of the first voltage signal into an amplitude between the fourth power supply voltage of a second polarity and the reference power supply voltage as the first high voltage control signal of a second polarity, and outputs a signal generated by converting an amplitude of the second voltage signal into an amplitude between the third power supply voltage of a first polarity and the reference power supply voltage as the second high voltage control signal of a first polarity.

10. The drive circuit according to claim 8, which is constituted by transistors each having a withstand voltage lower than a voltage difference between the third power supply voltage of a first polarity and the fourth power supply voltage of a second polarity.

11. A display driver comprising:

a data register latch that captures a series of pieces of pixel data that represent a brightness level of each pixel based on a video signal and outputs a plurality of the captured pieces of pixel data;

a plurality of level shift circuit groups that each converts a signal level of one of the plurality of pieces of pixel data output from the data register latch into one of a high voltage signal of a positive polarity and a high voltage signal of a negative polarity;

a decoder circuit that converts each of the high voltage signal of a positive polarity and the high voltage signal of a negative polarity for each piece of pixel data into one of a gradation voltage signal of a positive polarity and a gradation voltage signal of a negative polarity; and a drive circuit group that outputs a signal obtained by alternately selecting the gradation voltage signal of a positive polarity and the gradation voltage signal of a negative polarity for each output channel as a drive voltage signal via an output terminal based on a low voltage control signal group for controlling a drive timing, wherein the drive circuit group includes a signal level conversion circuit to which a drive reference power supply voltage, a low voltage positive polarity power supply voltage and a high voltage positive polarity power supply voltage having a positive polarity with respect to the reference power supply voltage, and a low voltage negative polarity power supply voltage and a high voltage negative polarity power supply voltage having a negative polarity with respect to the reference power supply voltage are supplied and which converts a voltage amplitude of the low voltage control signal group to generate a high voltage control signal group, all drive circuits of the drive circuit group are constituted by transistors each having an element withstand voltage lower than a voltage difference between the high voltage positive polarity power supply voltage and high voltage negative polarity power supply voltage, and each drive circuit of the drive circuit group includes the drive circuit according to claim 6.

12. A display device comprising:

the display driver according to claim 11; and a liquid crystal display panel which is driven according to the drive voltage signal output from the output terminal for each output channel of the display driver.

13. A display driver comprising:

a data register latch that captures a series of pieces of pixel data that represent a brightness level of each pixel based on a video signal and outputs a plurality of the captured pieces of pixel data;

a plurality of level shift circuit groups that each converts a signal level of one of the plurality of pieces of pixel data output from the data register latch into one of a high voltage signal of a positive polarity and a high voltage signal of a negative polarity;

a decoder circuit that converts each of the high voltage signal of a positive polarity and the high voltage signal of a negative polarity for each piece of pixel data into one of a gradation voltage signal of a positive polarity and a gradation voltage signal of a negative polarity; and a drive circuit group that outputs a signal obtained by alternately selecting the gradation voltage signal of a positive polarity and the gradation voltage signal of a negative polarity for each output channel as a drive voltage signal via an output terminal based on a low voltage control signal group for controlling a drive timing, wherein the drive circuit group includes a signal level conversion circuit to which a drive reference power supply voltage, a low voltage positive polarity power supply voltage and a high voltage positive polarity power supply voltage having a positive polarity with respect to the reference power supply voltage, and a low voltage negative polarity power supply voltage and a high voltage negative polarity power supply voltage having a negative polarity with respect to the reference power supply voltage are supplied and which converts a voltage amplitude of the low voltage control signal group to generate a high voltage control signal group, all drive circuits of the drive circuit group are constituted by transistors each having an element withstand voltage lower than a voltage difference between the high voltage positive polarity power supply voltage and high voltage negative polarity power supply voltage, and each drive circuit of the drive circuit group includes the drive circuit according to claim 8.

14. A display device comprising:

the display driver according to claim 13; and a liquid crystal display panel which is driven according to the drive voltage signal output from the output terminal for each output channel of the display driver.

15. A display driver comprising:

a data register latch that captures a series of pieces of pixel data that represent a brightness level of each pixel based on a video signal and outputs a plurality of the captured pieces of pixel data;

a plurality of level shift circuit groups that each converts a signal level of one of the plurality of pieces of pixel data output from the data register latch into one of a high voltage signal of a positive polarity and a high voltage signal of a negative polarity;

a decoder circuit that converts each of the high voltage signal of a positive polarity and the high voltage signal of a negative polarity for each piece of pixel data into one of a gradation voltage signal of a positive polarity and a gradation voltage signal of a negative polarity; and a drive circuit group that outputs a signal obtained by alternately selecting the gradation voltage signal of a positive polarity and the gradation voltage signal of a negative polarity for each output channel as a drive voltage signal via an output terminal based on a low voltage control signal group for controlling a drive timing, wherein the drive circuit group includes a signal level conversion circuit to which a drive reference power supply voltage, a low voltage positive polarity power supply voltage and a high voltage positive polarity power supply voltage having a positive polarity with respect to the reference power supply voltage, and a low voltage negative polarity power supply voltage and a high voltage negative polarity power supply voltage having a negative polarity with respect to the reference power supply voltage are supplied and which converts a voltage amplitude of the low voltage control signal group to generate a high voltage control signal group, all drive circuits of the drive circuit group are constituted by transistors each having an element withstand voltage lower than a voltage difference between the high voltage positive polarity power supply voltage and high voltage negative polarity power supply voltage, and each drive circuit of the drive circuit group includes the drive circuit according to claim 9.

16. A display device comprising:

the display driver according to claim 15; and a liquid crystal display panel which is driven according to the drive voltage signal output from the output terminal for each output channel of the display driver.

* * * * *